(12) United States Patent
Shepard et al.

(10) Patent No.: US 11,561,284 B2
(45) Date of Patent: Jan. 24, 2023

(54) PARALLAX COMPENSATING SPATIAL FILTERS

(71) Applicant: Waymo LLC, Mountain View, CA (US)

(72) Inventors: Ralph Hamilton Shepard, Menlo Park, CA (US); Blaise Gassend, East Palo Alto, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 1023 days.

(21) Appl. No.: 16/236,442

(22) Filed: Dec. 29, 2018

(65) Prior Publication Data

US 2020/0142034 A1 May 7, 2020

Related U.S. Application Data

(60) Provisional application No. 62/755,252, filed on Nov. 2, 2018.

(51) Int. Cl.
*G01S 7/481* (2006.01)
*G01S 17/08* (2006.01)
*G01S 17/931* (2020.01)

(52) U.S. Cl.
CPC ............ *G01S 7/4816* (2013.01); *G01S 17/08* (2013.01); *G01S 17/931* (2020.01)

(58) Field of Classification Search
CPC ...... G01S 7/4816; G01S 7/4868; G01S 17/08; G01S 17/931; G01S 17/90; G02B 5/20
See application file for complete search history.

(56) References Cited

U.S. PATENT DOCUMENTS

| 5,159,412 A | 10/1992 | Willenborg et al. |
| 5,678,089 A | 10/1997 | Bacs, Jr. et al. |
| 6,603,534 B2 * | 8/2003 | Seifert .................. G01S 7/4811 356/4.01 |
| 10,012,532 B2 | 7/2018 | Send et al. |
| 10,502,830 B2 | 12/2019 | Droz et al. |
| (Continued) | | |

FOREIGN PATENT DOCUMENTS

| CN | 101273297 A | 9/2008 |
| CN | 102540651 A | 7/2012 |
| (Continued) | | |

OTHER PUBLICATIONS

The International Search Report (ISR) with Written Opinion for PCT/US2019/058262 dated Feb. 19, 2020, pp. 1-11.

*Primary Examiner* — Yuqing Xiao
*Assistant Examiner* — Benjamin Richard Hebert
(74) *Attorney, Agent, or Firm* — McDonnell Boehnen Hulbert & Berghoff LLP

(57) ABSTRACT

One example system includes a lens disposed relative to a scene and configured to focus light from the scene. The system also includes an opaque material. The opaque material defines a plurality of apertures including a primary aperture and one or more secondary apertures. The system also includes one or more light detectors (e.g., a single element detector or an array of detectors) configured to intercept and detect diverging light focused by the lens and transmitted through at least one of the plurality of apertures defined by the opaque material.

25 Claims, 12 Drawing Sheets

(56) References Cited

U.S. PATENT DOCUMENTS

| | | | |
|---|---|---|---|
| 2006/0163455 A1* | 7/2006 | Lewin | G01S 17/04 |
| | | | 250/221 |
| 2009/0009747 A1* | 1/2009 | Wolf | G01C 3/08 |
| | | | 356/4.01 |
| 2009/0147239 A1 | 6/2009 | Zhu et al. | |
| 2010/0128353 A1 | 5/2010 | Nagata et al. | |
| 2013/0038666 A1 | 2/2013 | Harigai et al. | |
| 2015/0293018 A1 | 10/2015 | Stork et al. | |
| 2016/0042522 A1 | 2/2016 | Wajs et al. | |
| 2018/0106900 A1 | 4/2018 | Droz et al. | |
| 2018/0136321 A1 | 5/2018 | Verghese et al. | |
| 2018/0156659 A1 | 6/2018 | Droz et al. | |
| 2018/0231642 A1 | 8/2018 | Lee et al. | |
| 2018/0238999 A1* | 8/2018 | Koyama | G01S 17/10 |
| 2018/0284284 A1* | 10/2018 | Curatu | G01S 17/42 |
| 2018/0329065 A1* | 11/2018 | Pacala | H04B 10/6973 |
| 2019/0079189 A1* | 3/2019 | Weber | G01S 17/10 |
| 2019/0204423 A1* | 7/2019 | O'Keeffe | G01S 17/89 |
| 2019/0331775 A1* | 10/2019 | Song | G01S 7/4863 |

FOREIGN PATENT DOCUMENTS

| | | |
|---|---|---|
| CN | 103365123 A | 10/2013 |
| CN | 105921186 A | 9/2016 |
| CN | 106711003 A | 5/2017 |
| CN | 107924817 A | 4/2018 |
| CN | 108549085 A | 9/2018 |
| EP | 2910969 A1 | 8/2015 |
| JP | 2007-121083 | 5/2007 |
| JP | 2012-202776 A | 10/2012 |
| WO | 2014144157 A1 | 9/2014 |
| WO | 2018/071251 A1 | 4/2018 |

\* cited by examiner

PARALLAX COMPENSATING SPATIAL FILTERS

CROSS-REFERENCE TO RELATED APPLICATION

This application claims priority to U.S. Provisional Patent Application No. 62/755,252 filed on Nov. 2, 2018, the entirety of which is incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, corresponding to an intensity of the light). Many types of such devices are fabricated out of semiconducting materials, such as silicon. In order to detect light over a substantial geometric area, multiple light detectors can be arranged into arrays connected in parallel. These arrays are sometimes referred to as silicon photomultipliers (SiPMs) or multi-pixel photon counters (MPPCs).

SUMMARY

In one example, a system includes a lens disposed relative to a scene and configured to focus light from the scene. The system also includes an opaque material. The opaque material defines a plurality of apertures including a primary aperture and one or more secondary apertures. The system also includes one or more light detectors arranged to intercept light focused by the lens and transmitted through at least one of the plurality of apertures.

In another example, a method involves focusing, by a lens disposed relative to a scene, light from the scene. The method also involves transmitting the focused light through at least one of a plurality of apertures defined within an opaque material. The plurality of apertures includes a primary aperture and one or more secondary apertures. The method also involves intercepting, by one or more light detectors, light transmitted through the at least one of the plurality of apertures. The method also involves detecting, by the one or more light detectors, the intercepted light.

In yet another example, a light detection and ranging (LIDAR) device includes a LIDAR transmitter configured to illuminate a scene with light. The LIDAR device also includes a LIDAR receiver configured to receive light reflected by one or more objects within the scene. The LIDAR receiver includes a lens configured to focus the reflected light from the scene. The LIDAR receiver also includes an opaque material. The opaque material defines a plurality of apertures including a primary aperture and one or more secondary apertures. The LIDAR receiver also includes one or more light detectors configured to detect light focused by the lens and transmitted through at least one of the plurality of apertures.

In still another example, a system comprises means for focusing, by a lens disposed relative to a scene, light from the scene. The system also comprises means for transmitting the focused light through at least one of a plurality of apertures defined within an opaque material. The plurality of apertures includes a primary aperture and one or more secondary apertures. The system also comprises means for intercepting, by one or more light detectors, light transmitted through the at least one of the plurality of apertures. The system also comprises means for detecting, by the one or more light detectors, the intercepted light.

In still another example, a system is provided. The system comprises a light detection and ranging (LIDAR) device in a bistatic configuration. The LIDAR device is configured to operate while moving relative to an object. The LIDAR device comprises a transmit lens that transmits light for illuminating the object, a receive lens that focuses light from the object, and a spatial filter that receives the focused light from the receive lens. The spatial filter includes a primary pinhole arranged to transmit, through the spatial filter, at least a threshold portion of the focused light based on the object being at greater than a threshold distance to the LIDAR device. The spatial filter also includes one or more secondary pinholes disposed at one or more positions relative to the primary pinhole. A respective size of each of the one or more secondary pinholes is less than a size of the primary pinhole. The one or more secondary pinholes are arranged to transmit, through the spatial filter, one or more portions of the focused light based on the object being at less than the threshold distance to the LIDAR device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
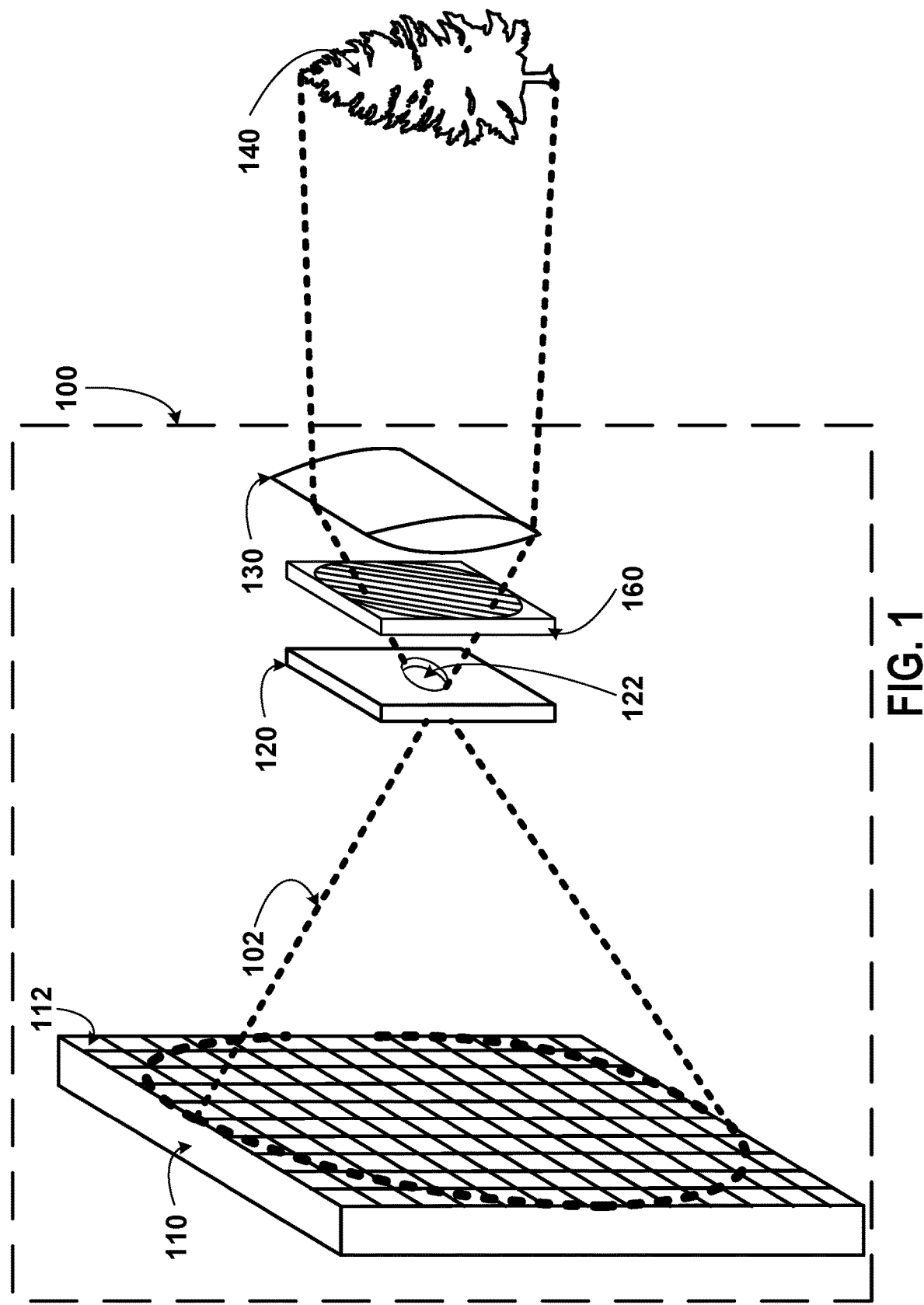
FIG. 1 is an illustration of a light detection system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein. Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments may relate to devices, systems, and methods for reducing background light imparted onto one or more light detectors (e.g., a single element detector or an array of detectors). The light detector(s) may be sensing light from a scene (e.g., the light detector(s) may be a component of a LIDAR system).

One example system can include a lens. The lens may be used to focus light from a scene onto a focal plane. However, the lens may also focus background light not intended to be observed onto the focal plane (e.g., sunlight within the scene). In order to selectively filter the light (i.e., separate background light from light corresponding to information within the scene), an opaque material (e.g., selectively etched metal or a glass substrate with a mask placed over it) may be placed at the focal plane of the lens. The opaque material could be a slab, a sheet, or various other shapes in a variety of embodiments. Within the opaque material, an aperture may be defined. The aperture may transmit a portion of, or the entirety of, the light of the scene focused by the lens onto the focal plane.

On a backside of the opaque material (i.e., a side of the opaque material opposite the lens), the light selected by the aperture may diverge from the aperture. In the direction of divergence of the light, the system may include one or more light detectors (e.g., SPADs) disposed some distance from the aperture. The light detector(s) may detect the diverging light (e.g., an intensity of the diverging light). Because the light is diverging, a detection area available for the light detector(s) can be larger than a detection area corresponding to the same cone of light at the focal plane of the lens. This is due to the fact that the detection area would be more tightly focused, and thus smaller, at the focal plane of the lens than at a distance away from the aperture. As an example, an aperture having a cross-sectional area of 200 μm by 200 μm may occupy an equivalent area to hundreds of SPADs (e.g., each SPAD having a cross-sectional area between 200 μm$^2$ and 600 μm$^2$). By comparison, if the light diverges away from the aperture to a distance corresponding to a circular cross-sectional area having a diameter of 1.33 mm, the detection area, at that plane, may occupy an equivalent area to thousands or tens of thousands of SPADs.

In some scenarios, where the example system is part of a LIDAR device for instance, the light from the scene may include reflections of light transmitted by one or more light sources (e.g., LIDAR transmitter) that have a different line-of-sight (LOS) with respect to the scene than the LOS of the light detectors. For example, the LIDAR transmitter may illuminate the scene from a different viewpoint (e.g., spatial position) than a viewpoint of the aperture which selects the light detected by the light detectors. Due to the offset between the positions of the light source(s) and the light detector(s), the lens may project returning reflections of the transmitted light onto different regions of the focal plane (e.g., depending on the respective distances between the LIDAR device and the respective objects that reflect the transmitted light back to the LIDAR device). This phenomenon is generally referred to as parallax.

To mitigate the effects of parallax, in some examples, the opaque material may have multiple apertures defined therein. For example, the opaque material may define a primary aperture (e.g., at or near the focal point of the lens) which selects focused light that was received by the LIDAR from distant objects (e.g., less susceptible to parallax errors). The opaque material may also define one or more secondary apertures (e.g., at off-axis, off-center, out-of-focus, etc., positions) which select focused light that was received by the LIDAR from nearer objects (e.g., more susceptible to parallax errors). For instance, the one or more secondary apertures can be arranged at positions on the focal plane where parallax-shifted portions of the focused light are expected (e.g., based on the relative geometric arrangement of a LIDAR transmitter and a LIDAR receiver, etc.).

In some examples, the multiple apertures may have different shapes and/or sizes. In one example, the primary aperture may have a larger size than the secondary apertures. As noted above, parallax-shifted light portions received at the secondary apertures may correspond to light reflected from relatively near object. In general, the intensity of light reflected from an object back to the LIDAR is expected to decrease as the distance between the object and the LIDAR increases. Thus, in this example, the relatively smaller secondary apertures could transmit a sufficient amount of light (due to the expected relatively higher light intensity of the parallax-shift light portions). Additionally, in this example, a sufficient amount of light reflected from a distant object (i.e., expected to have a relatively lower light intensity) could also be transmitted through the relatively larger primary aperture. Other examples are possible.

In line with the discussion above, one example LIDAR device herein may have a bistatic configuration. A bistatic LIDAR, for example, may have separate transmit and receive lenses. The lateral separation between the two lenses may cause parallax as a function of range to a target object. For instance, as the distance between the LIDAR and the target object changes, an image of the object at the focal plane of the receiver of the LIDAR may shift laterally. In this example, if a spatial filter (e.g., opaque material with a primary aperture/pinhole at the focal plane of the receive lens) is used in a receiver of the LIDAR to suppress background radiation, then the image may "walk off" from the primary pinhole thereby causing a decrease in the intensity of light transmitted through the spatial filter at relatively short ranges (e.g., distances between the target object and the LIDAR). In some instances, the change in the intensity of the received signal may not be uniform. For instance, due to internal reflections of the parallax-shifted image inside the LIDAR (e.g., at walls of receiver, etc.), the intensity of the received signal may also sporadically increase as the target object becomes nearer to the LIDAR (as opposed to a uniform gradual decrease in the intensity as the target object becomes nearer).

Thus, to facilitate improving the uniformity and intensity of the received signal when the target object is at a short range (e.g., within 1 meter, etc.) to the LIDAR, the spatial filter may include one or more smaller pinholes (e.g., secondary apertures) that are arranged to transmit portions of the parallax-shifted image toward the detector(s) (e.g., thereby improving the uniformity of the received signal as a function of range or distance to the target object, etc.).

II. Example Devices and Systems

FIG. 1 is an illustration of a system 100, according to example embodiments. The system 100 may include an array 110 of light detectors (exemplified by detector 112), an aperture 122 defined within an opaque material 120, a lens 130, and a filter 160. The system 100 may measure light 102 received from an object 140 within a scene. The light 102 may also come, at least partially, from background sources.

In some embodiments, system 100 may be implemented as part of a LIDAR device (e.g., a LIDAR receiver). In one example, the LIDAR device that includes system 100 may be used for vehicle navigation. In some embodiments, system 100, or portions thereof, may be optically isolated (e.g., disposed in a housing, etc.) from exterior light other than light entering system 100 through the lens 130.

Array 110 includes an arrangement of light detectors (exemplified by detector 112). In various embodiments, array 110 may have different shapes. As illustrated in FIG. 1, array 110 may have a rectangular or a square shape. In alternative embodiments, array 110 may be circular, or have any other shape. The size of array 110 may be selected to correspond to a cross-sectional area of light 102 (diverging out of aperture 122); thus, the size of array 110 may be selected based on the distance between array 110 and aperture 122. In some embodiments, array 110 may be movable. For example, the array may be on an electrical stage capable of translating the array in one, two, or three directions. In one embodiment, array 110 may be moveable closer to, or further from, aperture 122.

Further, array 110 may have one or more outputs to a computing device. The computing device (e.g., a microprocessor) may receive electrical signals from array 110 which indicate an intensity of light 102 incident on the light detectors (e.g., 112) of the array. The computing device may use the electrical signals to determine information about object 140 (e.g., distance of the object 140 from the aperture 122). In some embodiments, the light detectors (e.g., 112, etc.) within array 110 may be interconnected with one another in parallel to provide a combined output signal indicating detections by any combination of the light detectors in the array. For example, array 110 may be implemented as a SiPM or an MPPC, depending on the particular arrangement and type of the light detectors of array 110.

The light detectors (e.g., detector 112, etc.) in array 110 may include a variety of types of detectors. In one embodiment, the light detectors (e.g., 112) may include SPADs. SPADs may make use of avalanche breakdown within a reverse biased p-n junction (i.e., diode) to increase output current for a given incident illumination on the photodetector. Further, SPADs may be able to generate multiple electron-hole pairs for a single incident photon. In another embodiment, the light detectors may include APDs. Both APDs and SPADs may be biased above the avalanche breakdown voltage. Such a biasing condition may create a positive feedback loop having a loop gain that is greater than one. Thus, APDs and SPADs biased above the threshold avalanche breakdown voltage may be single photon sensitive. In still other embodiments, the light detectors (e.g., 112, etc.) may include photoresistors, charge-coupled devices (CCDs), photovoltaic cells, or any other type of light sensor.

In various embodiments, array 110 may include more than one type of light detector across the array. For example, array 110 may be configured to detect multiple wavelengths. In this example, array 110 may comprise one or more SPADs that are sensitive to one range of wavelengths and one or more SPADs that are sensitive to a different range of wavelengths. In some embodiments, the light detectors of array 110 may be sensitive to wavelengths between 400 nm and 1.6 μm (visible and infrared wavelengths). Further, the light detectors of array 110 may have various sizes and shapes within a given embodiment or across various embodiments. In one embodiment, the light detectors (e.g., 112) may include SPADs that have package sizes that are 1%, 0.1%, or 0.01% of the area of array 110.

Opaque material 120 may prevent (or reduce) at least a portion of light 102 focused by lens 130 from being transmitted to array 110. For instance, opaque material 120 may be configured to block certain background light that could adversely affect the accuracy of a measurement collected using the light detectors of array 110. In some examples, opaque material 120, and therefore aperture 122, may be positioned at or near a focal plane of the lens 130. Opaque material 120 may block transmission by absorbing light 102 incident thereon. Additionally or alternatively, opaque material 120 may block transmission of light 102 by reflecting and/or otherwise diverting light 102 away from array 110. In some embodiments, opaque material 120 may include an etched metal. In alternative embodiments, opaque material 120 may include a polymer substrate, a biaxially-oriented polyethylene terephthalate (BoPET) sheet (also referred to as a Mylar® sheet), or a glass overlaid with an opaque mask. Other opaque materials are also possible in various alternative embodiments.

Aperture 122 provides a port within opaque material 120 through which light 102 may be transmitted toward array 110. Aperture 122 may be defined within opaque material 120 in a variety of ways. In one example, opaque material 120 may include a metal; and the metal may be etched to define aperture 122. In another example, opaque material 120 may include a glass substrate overlaid with a mask; and the mask may include an aperture 122 defined using photolithography. In various embodiments, aperture 122 may be partially or wholly transparent. For example, where opaque material 120 includes a glass substrate overlaid with a mask, aperture 122 may be defined as a portion of the glass substrate that is not covered by the mask. Thus, in this example, aperture 122 is not completely hollow, but rather is made of glass. In some examples, aperture 122 may be nearly, but not entirely, transparent to the wavelengths of light 102 scattered by object 140 (e.g., most glasses are not 100% transparent).

Aperture 122 (in conjunction with opaque material 120) may be configured to spatially filter light 102 from the scene. For example, light 102 may be focused onto opaque material 120, and aperture 122 may allow only a portion of the focused light to be transmitted to array 110. Thus, aperture 122 may behave as an optical pinhole.

For the sake of example, aperture 122 is shown to have a circular shape. In alternative embodiments, aperture 122 may have a different shape, such as a rectangular shape, a keyhole shape, or any other shape.

Although the term "aperture" as used above with respect to aperture 122 describes a recess or hole in an opaque material through which light may be transmitted, it is understood that the term "aperture" may include a broad array of optical features. For example, as used throughout the description and claims, the term "aperture" may additionally encompass transparent or translucent structures defined within an opaque material through which light can be partially transmitted. Further, the term "aperture" may describe a structure that otherwise selectively limits the passage of light (e.g., through reflection or refraction), such as a mirror surrounded by an opaque material. In one example embodiment, mirrored arrays surrounded by an opaque material may be arranged to reflect light in a certain direction, thereby defining a reflective portion. This reflective portion may be referred to as an "aperture".

Lens 130 may focus light 102 from the scene toward a focal plane of the lens (e.g., toward opaque material 120). In this way, the light intensity collected from the scene, at the lens 130, may be maintained while reducing the cross-sectional area over which light 102 is being projected (i.e., increasing the spatial power density of light 102). In one example, lens 130 may include a converging lens. As illustrated in FIG. 1, in some examples, lens 130 may include a biconvex lens. In some examples, lens 130 may include a spherical lens. In alternative embodiments, lens may include an assembly of multiple lenses or other optical elements (e.g., a biconvex lens that focuses light in a first direction and an additional biconvex lens that focuses light in a second plane that is orthogonal to the first direction). Other types of lenses are also possible. In addition, there may be other free space optics (e.g., mirrors) positioned near lens 130 to aid in focusing light 102 incident on lens 130 onto opaque material 120.

Object 140 may be any object positioned within a scene surrounding system 100. In examples where system 100 is a component of a receiver of a LIDAR system, object 140 may be illuminated by a transmitter of the same LIDAR system. In example embodiments where the LIDAR system is used for navigation of a vehicle for instance, object 140 may include pedestrians, other vehicles, obstacles (e.g., trees), or road signs, among other possibilities.

In one example scenario, as described above, light 102 may include light from a transmitter of a LIDAR device. In this scenario, light 102 (or a portion thereof) may be reflected by object 140, focused by lens 130, transmitted through aperture 122, and then measured by array 110. This sequence may occur (e.g., via a LIDAR device) to determine information about the object 140, for instance. In some embodiments, the light measured by the array may also include light reflected by multiple objects and/or light from other sources (e.g., ambient light).

In addition, the wavelength of light 102 used to analyze object 140 may be tailored based on the types of objects expected to be within a scene and their expected distance from lens 130. For example, if the objects expected to be within the scene absorb incoming light of 500 nm wavelength, a wavelength other than 500 nm may be selected to illuminate object 140 and to be analyzed by system 100. The wavelength of light 102 (e.g., transmitted by a transmitter of a LIDAR device) may depend on a source that generates light 102. For instance, a particular diode laser may emit light 102 having a wavelength range that includes 900 nm. Other sources capable of generating light 102 within any particular wavelength range are possible as well (e.g., optical fiber amplifier, lasers, broadband source with a filter, etc.).

Filter 160 may include a bandpass filter or any other optical filter configured to selectively transmit incident light (focused by lens 130) from the scene. Optical filter 160 may be configured to divert light of particular wavelengths away from array 110. For example, where system 300 is a component of a LIDAR device (e.g., a LIDAR receiver), optical filter 160 may divert (e.g., away from aperture 122) light that is not of the wavelength range emitted by an emitter of the LIDAR device (e.g., LIDAR transmitter). For instance, optical filter 160 may, at least partially, prevent ambient or background light from adversely affecting measurements by array 110.

In various embodiments, optical filter 160 may be located in various positions relative to the array 110. In the embodiment shown, optical filter 160 may be located in between the lens 130 and the opaque material 120. In alternative embodiments, optical filter 160 may be located between the lens and the object, between the opaque material and the array, or on the array itself (e.g., a single optical filter may be disposed on the array, or each of the light detectors may individually be covered by a separate optical filter).

In some examples, optical filter 160 may include an absorptive filter (e.g., a filter that absorbs a portion of incident light), a reflective filter (e.g., a filter that reflects a portion of incident light), and/or other type of filter (e.g., a filter that adjusts a direction of incident light based on its wavelength). Thus, in various examples, optical filter 160 may selectively transmit wavelengths within a defined wavelength range (e.g., a bandpass optical filter, a monochromatic optical filter, etc.), wavelengths outside a defined wavelength range (i.e., a band-rejection optical filter, etc.), wavelengths below a defined threshold (i.e., a low-pass optical filter), or wavelengths above a defined threshold (i.e., a high-pass optical filter).

In some embodiments, filter 160 may include multiple optical filters optically coupled to achieve certain filtering characteristics (e.g., a low-pass filter cascaded with a high-pass filter to achieve a band-pass filter characteristic, etc.). In some embodiments, optical filter 160 may include a dichroic filter or one or more (e.g., cascaded) dichroic filters. In alternative embodiments, the optical filter 160 may include a diffractive filter. A diffractive filter may split the optical path of background light and signal light, for instance. For instance, filter 160 may direct background light to another light detector array (not shown). In this instance, system 100 could thus measure background light separately from the measurement by array 110.

In some embodiments, filter 160 may include an optical diffuser configured to distribute the power density of light 102 transmitted through the aperture 122 among the light detectors 112 (e.g., to achieve a more uniform energy distribution). For instance, the optical diffuser may include a sandblasted glass diffuser, a ground glass diffuser, or a holographic diffuser, in various embodiments. Other types of optical diffusers are also possible. Thus, filter 160 (e.g., optical diffuser) may be configured to enhance an aspect of the divergence of light 102 transmitted through the aperture 122. Other possible divergence enhancing components herein include optical waveguides or fluids with non-unity indices of refraction, for example.

In some examples, filter 160 may selectively transmit light based on light characteristics other than (or in addition to) wavelength. For example, optical filter 160 may selectively transmit light based on polarization (e.g., horizontally polarized or vertically polarized). Other types of optical filters are also possible.

Figure 2:
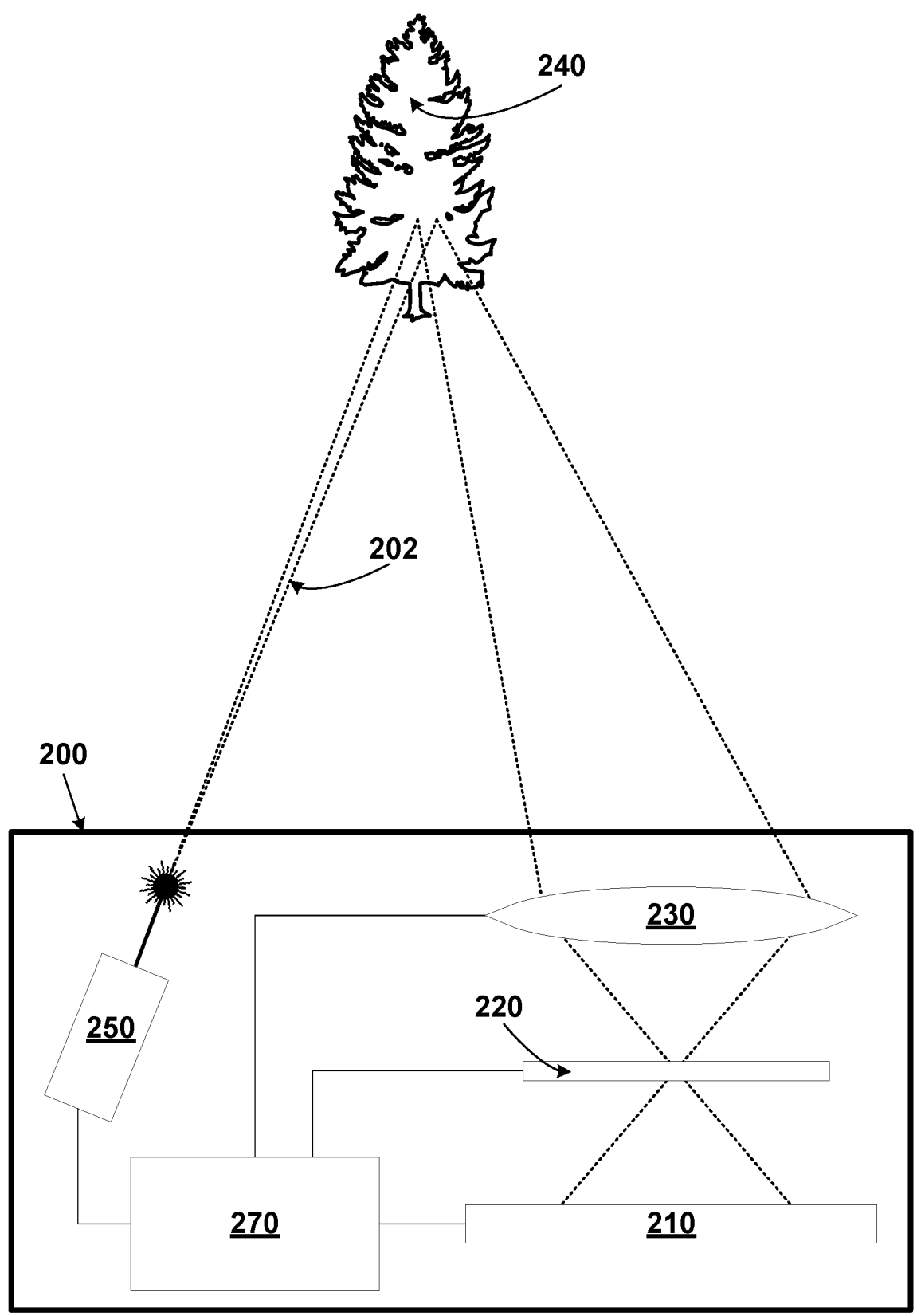
FIG. 2 is an illustration of a LIDAR device, according to example embodiments.

FIG. 2 is an illustration of a LIDAR device 200, according to example embodiments. As shown, LIDAR device 200 includes one or more light detectors 210, an opaque material 220, and a lens 230, which are similar to, respectively, array 110, opaque material 120, and lens 130 of system 100. Thus, in some examples, detector(s) 210 may be implemented as an array of light detectors similar to array 110. In alternate examples however, detector(s) 210 can be instead implemented as a single sensing element (e.g., a single detector). Further, for instance, although not shown, opaque material 220 may include an aperture (e.g., pinhole, etc.) through which a portion of light focused by lens 230 is transmitted for receipt by array 110. As shown, LIDAR device 200 also includes an emitter 250 and a computing device 270.

Emitter 250 may emit light 202 (e.g., similar to light 102) which is reflected by object 240 (e.g., similar to object 140) in the scene and ultimately measured by light detector(s) 210. In some embodiments, the laser emitter 250 may include an optical fiber amplifier or other amplifying system to increase a power output of the laser emitter 250. In other embodiments, laser emitter 250 may include a laser diode (e.g., diode bar, etc.), filament light source, liquid crystal display (LCD), filament light source, or any other type of light source. In some embodiments, laser emitter 250 may include a pulsed laser (as opposed to a continuous wave, CW, laser), allowing for increased peak power while maintaining an equivalent continuous power output.

Computing device 270 may be configured to control and/or analyze signals received from one or more components of the LIDAR device 200. To that end, computing device 270 may include one or more processors (e.g., a microprocessor of a microcontroller) that execute instructions stored within a memory (e.g., data storage) to cause LIDAR device 200 to perform various operations. For example, computing device 270 may use timing information associated with a signal measured via detector(s) 210 to determine a location of object 240 (e.g., distance between object 240 and LIDAR device 200). For example, in embodiments where laser emitter 250 is a pulsed laser, computing device 270 can monitor timings of output light pulses and compare those timings with timings of reflected light pulses detected by detector(s) 210. For instance, computing device 270 may compute the distance between device 200 and object 240 by accounting for the amount of time between emission of a light pulse (via emitter 250) and receipt of a reflection of the emitted light pulse (via detector(s) 210).

In some examples, computing device 270 may be configured to modulate light 202 emitted by laser emitter 250. For example, computing device 270 may be configured to change a pointing direction of laser emitter 250 (e.g., laser emitter 270 may be mounted to a mechanical stage controlled by computing device 270). In some examples, computing device 270 may also be configured to modulate the timing, the power, or the wavelength of light 202 emitted by the laser emitter 250. Such modulations may include the addition or removal of filters from the path of the light 202, among other possibilities.

In some examples, computing device 270 may be configured to adjust the locations of lens 230, opaque material 220, and/or detector(s) 210 relative to one another. In one example, lens 230 could be mounted on a movable stage that is controlled by the computing device 270 to adjust the location of lens 230 (and thus the location of the focal plane of the lens 230). In another example, detector(s) 210 may be mounted on a separate stage that allows computing device 270 to move detector(s) 210 relative to opaque material 220 (and/or aperture(s) defined thereon). In some instances, detector(s) 210 may be moved by computing device 270 to alter the detection area on detector(s) 210. For instance, detector(s) 210 can be moved farther from opaque material 220 to increase the cross-sectional detection area on detector(s) 210 (e.g., due to divergence of light 202 diverges transmitted through the aperture of opaque material 220). Thus, computing device 270 may move detector(s) 210 to alter the number of light detectors illuminated by the diverging light.

In some embodiments, the computing device may also be configured to control the aperture. For example, the aperture may, in some embodiments, be selectable from a number of apertures defined within the opaque material. In such embodiments, a MEMS mirror located between the lens and the opaque material may be adjustable by the computing device to determine to which of the multiple apertures the light is directed. In some embodiments, the various apertures may have different shapes and sizes. In still other embodiments, an aperture may be defined by an iris (or other type of diaphragm). The iris may be expanded or contracted by the computing device, for example, to control the size of the aperture.

Figure 3:
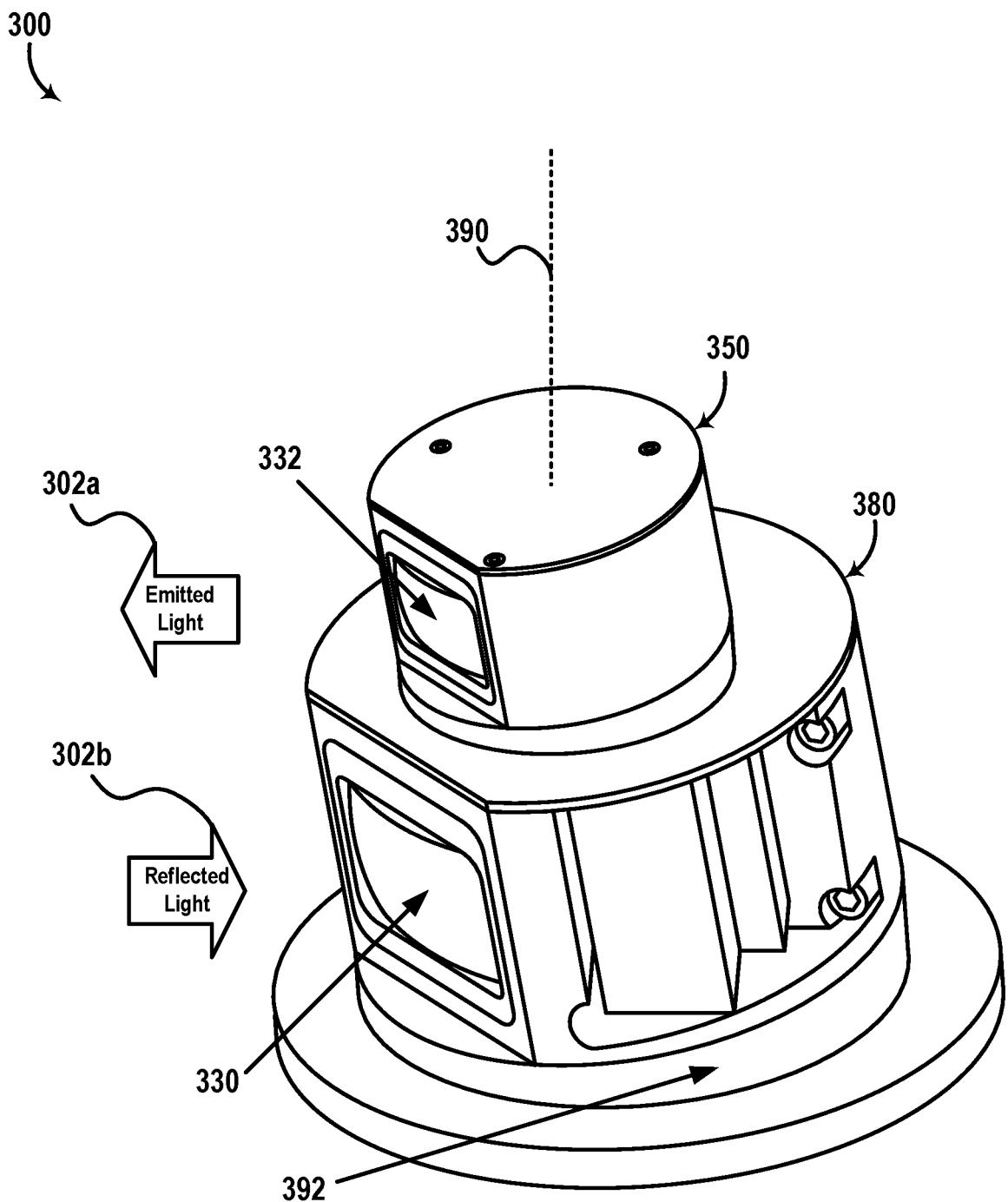
FIG. 3 is an illustration of another LIDAR device, according to example embodiments.

FIG. 3 illustrates another LIDAR device 300, according to example embodiments. As shown, device 300 includes a LIDAR transmitter 350, a LIDAR receiver 380, and a rotating platform 392.

LIDAR transmitter 350 may be configured to emit light 302a toward an environment of device 300, similarly to, respectively, emitter 250 and light 202 of device 200. As shown, transmitter 350 may include a transmit lens 332. Lens 332 may be configured to direct (e.g., and/or collimate, etc.) emitted light 302a transmitted out of LIDAR device 300 to illuminate a particular region of the environment of device 300. Although not shown, transmitter 350 may also include an emitter (e.g., similar to emitter 250), inside a housing of transmitter 350. For instance, the emitter may be configured to emit light 302a through transmit lens 332 and out of LIDAR device 300 toward the surrounding environment.

LIDAR receiver 380 may include a light detection system (e.g., system 100). For example, receiver 380 may be configured to receive at least a portion of emitted light 302a that reflects off one or more objects in the environment and returns to LIDAR device 300 as reflected light 302b, in line with the discussion above. For instance, as shown, receiver 380 includes a receive lens 330, which may be similar to lenses 130 and/or 230. Further, although not shown, receiver 380 may include one or more components (e.g., inside a housing of receiver 380) similar to the components of system 100, such as an optical filter (e.g., filter 160), a spatial filter (e.g., opaque material 120), and/or one or more light detectors (e.g., light detector 112, array 110, etc.). Thus, in this instance, reflected light 302b may be focused by receive lens 130 through an aperture (not shown) for detection by one or more light detectors (not shown), in line with the description of FIGS. 1-2. The aperture, for instance, could be positioned at a particular position behind receive lens 330 to select a portion of focused light from lens 330 that includes reflected light 302b (e.g., light from the region of the environment illuminated by emitted light 302a).

Rotating platform 392 (e.g., mechanical stage, etc.) supports receiver 380 and transmitter 350 in the particular relative arrangement shown. To that end, rotating platform 392 can be formed from any solid material suitable for supporting one or more components of LIDAR 300. In one example, rotating platform 392 may be configured to rotate about axis 390. During the rotation, the pointing directions of transmitter 350 and receiver 380 may simultaneously change to remain in the particular relative arrangement shown. Thus, LIDAR 300 can scan different regions of the surrounding environment according to different rotational positions of LIDAR 300 about axis 390. For instance, device 300 (and/or another computing system) can determine a three-dimensional map of a 360° (or less) view of the environment of device 300 by processing data associated with different pointing directions of LIDAR 300 as the LIDAR rotates about axis 390. In one embodiment, LIDAR 300 can be mounted on a vehicle, and rotating platform 392 can be rotated to scan regions of the environment along various directions away from the vehicle.

In some examples, axis 390 may be substantially vertical. In these examples, the viewing or scanning direction of device 300 can be adjusted horizontally by rotating receiver 380 (and transmitter 350) about axis 390. In other examples, receiver 380 (and transmitter 350) can be tilted (relative to axis 390) to adjust the vertical extents of a field-of-view (FOV) scanned by LIDAR 300 as the LIDAR rotates about axis 390. By way of example, LIDAR 300 can be mounted on a top side of a vehicle, and receiver 380 (together with transmitter 350) can be tilted toward the vehicle. Thus, in this example, LIDAR 300 may collect more data points from regions of the environment that are closer to a driving surface on which the vehicle is located than data points from regions of the environment that are above the vehicle. Other mounting positions, tilting configurations, and/or applications of LIDAR device 300 are possible as well. For instance, the LIDAR can be mounted on a different side of the vehicle, on a robotic platform, or on any other mounting surface.

In order to rotate platform 392 in this manner, LIDAR device 300 may also include one or more actuators (not shown) configured to actuate (e.g., rotate, tilt, etc.) platform 382. Example actuators include motors, pneumatic actuators, hydraulic pistons, and/or piezoelectric actuators, among other possibilities.

Figure 4A:
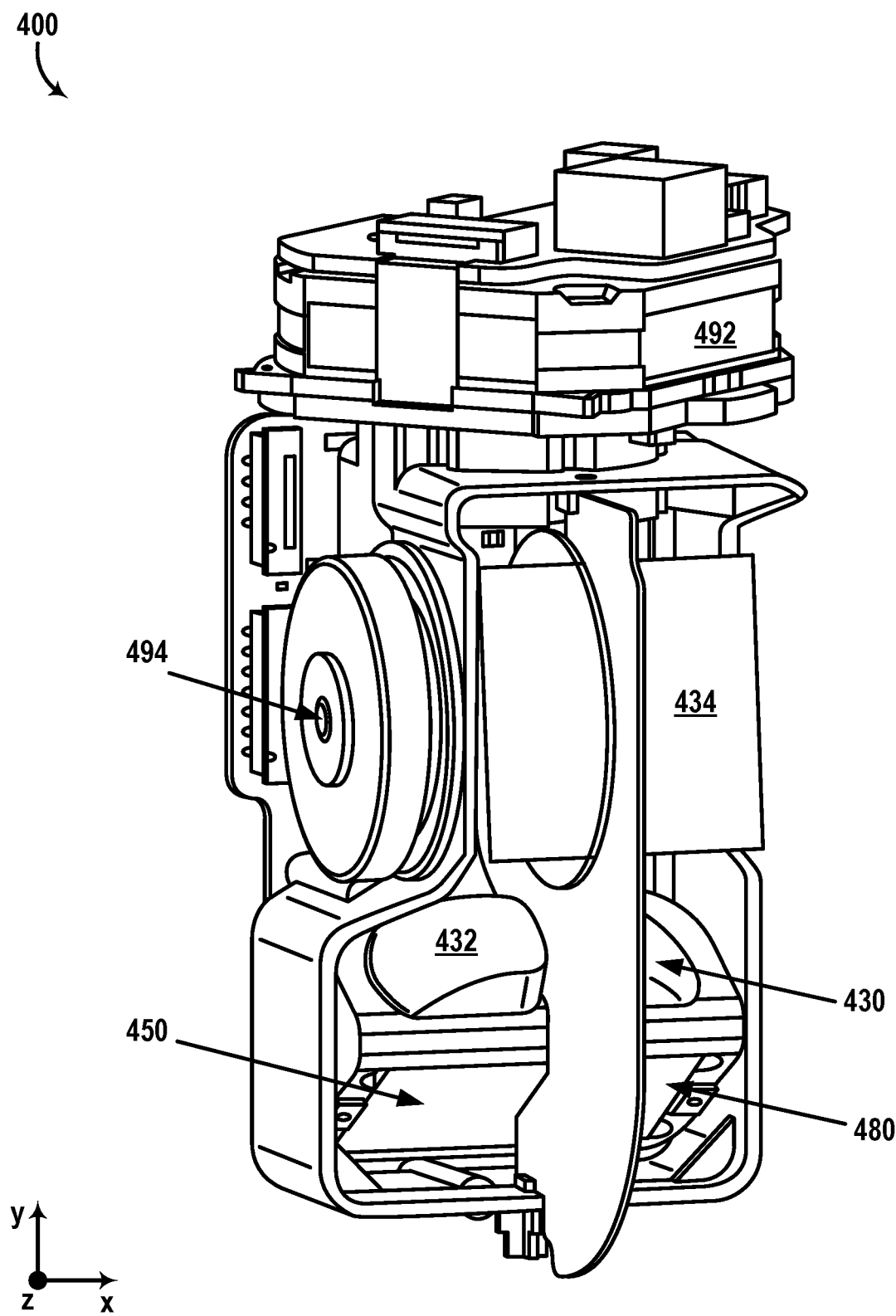
FIG. 4A is an illustration of yet another LIDAR device, according to example embodiments.

FIG. 4A illustrates another LIDAR device 400 that may be used with system 100, according to example embodiments. For convenience in description, FIG. 4A shows x-y-z orthogonal direction axes, where the x-axis and the y-axis are parallel to the surface of the page. As shown, LIDAR device 400 includes a receive lens 430, a transmit lens 432, a transmitter 450, a receiver 480, and a rotating platform 492, which are similar to, respectively, receive lens 330, transmit lens 332, transmitter 350, receiver 380, and rotating platform 392. As shown, device 400 also includes a mirror 434 and a motor 494. The motor 494 is configured to rotate the mirror 434 about a horizontal axis that is parallel to the x-axis.

In some examples, LIDAR transmitter 450 may emit light (via transmit lens 432) that reflects off mirror 434 to propagate away from LIDAR 400. Further, light from the environment of LIDAR 400 (including returning reflections of the emitted light) may be reflected off mirror 434 into LIDAR receiver 480 (via lens 430). Thus, for instance, a vertical scanning direction of LIDAR 400 can be controlled by rotating mirror 434 (e.g., about a horizontal axis parallel to the x-axis), and a horizontal scanning direction of LIDAR 400 can be controlled by rotating the LIDAR device about a vertical axis (e.g., parallel to the y-axis) using rotating platform 492.

In one embodiment, mirror 434 may be implemented as a triangular mirror. The triangular mirror could be rotated while transmitter 450 is emitting a series of light pulses toward the mirror. Depending on the rotational position of the mirror, each light pulse could thus be steered (e.g., vertically). As such, LIDAR 400 may scan a vertical FOV defined by a range of (vertical) steering directions provided by mirror 434. In some examples, LIDAR 400 may be configured to rotate mirror 434 one or more complete rotations to steer emitted light from transmitter 450 vertically. In other examples, LIDAR device 400 may be configured to rotate mirror 434 within a given range of angles to steer the emitted light over a particular range of directions (vertically). Thus, LIDAR 400 may scan a variety of vertical FOVs by adjusting the rotation of mirror 434. In one embodiment, the vertical FOV of LIDAR 400 is 110°.

Motor 494 may include any actuator such as a stepper motor, an electric motor, a combustion motor, a pancake motor, and/or a piezoelectric actuator, among other possibilities.

In some examples, platform 492 can also be rotated (e.g., about a vertical axis parallel to the y-axis) using a motor similar to motor 494. Rotation of the platform 492 rotates the mirror 434, motor 494, lenses 430 and 432, transmitter 450, and receiver 480 about the vertical axis. Thus, rotating platform 492 can be used to steer emitted light (from transmitter 450) horizontally (e.g., about an axis of rotation of platform 492). Additionally, the range of the rotation of platform 492 can be controlled to define a horizontal FOV of LIDAR 400. In one embodiment, platform 492 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 4B:
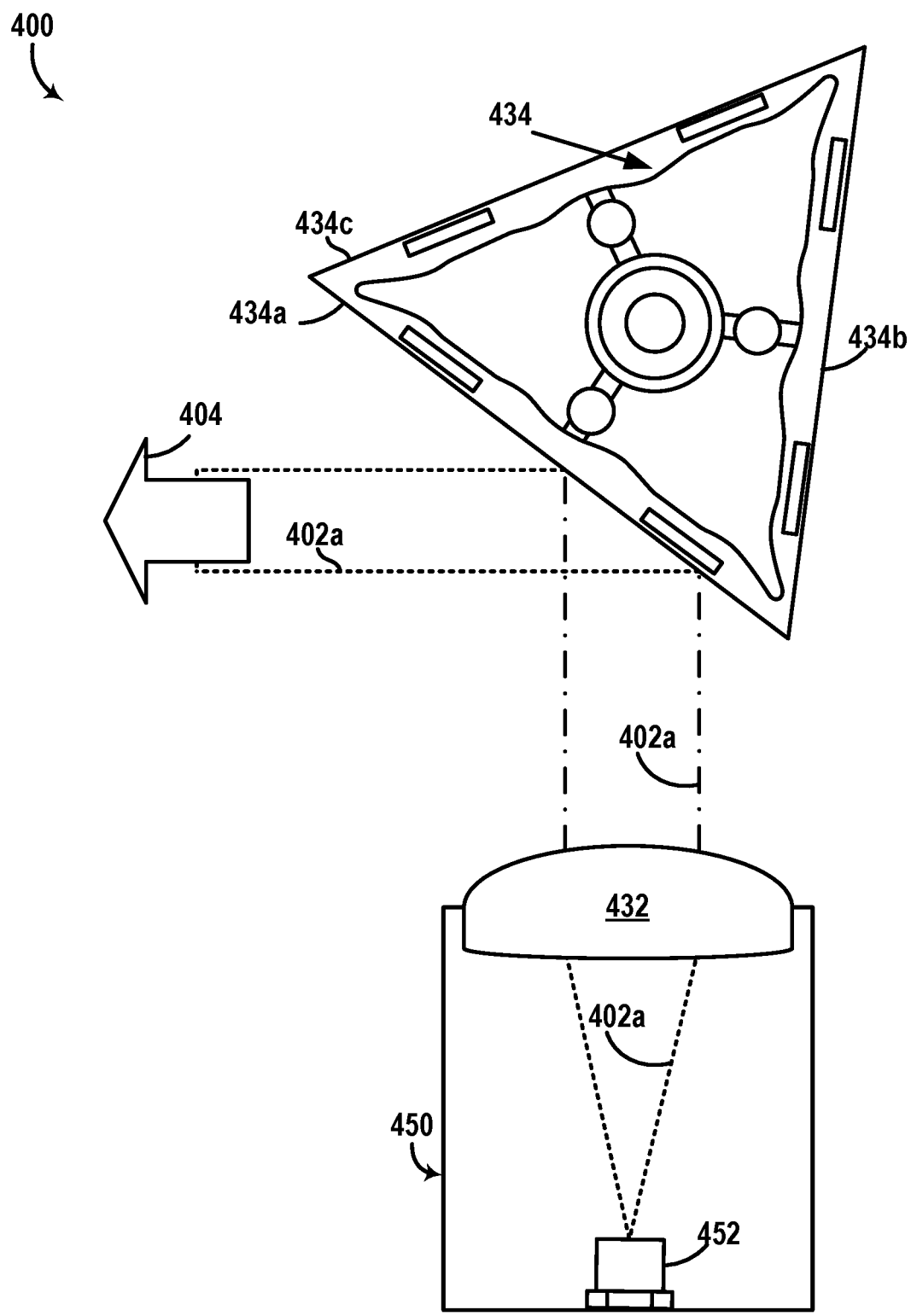
FIG. 4B illustrates a partial cross-section view of the LIDAR device of FIG. 4A, according to example embodiments.

FIG. 4B illustrates a partial cross-section view of LIDAR device 400. It is noted that some of the components of LIDAR 400 are omitted from the illustration of FIG. 4B for convenience in description.

As shown in FIG. 4B, transmitter 450 includes a light source 452, which may be similar to any of the light sources described for emitter 250 for instance. In alternative embodiments, transmitter 450 may alternatively include more than one light source. Light source 452 may be configured to emit one or more light pulses 402a (e.g., laser beams, etc.) toward lens 432. In some examples, transmit lens 432 may be configured to direct (and/or collimate) emitted light 402a toward mirror 434.

As shown in FIG. 4B, mirror 434 may include a triangular mirror that has three reflective surfaces 434a, 434b, 434c. However, in other examples, mirror 434 may alternatively include additional or fewer reflective surfaces. In the example shown, light 402a may then reflect off reflective surface 434a and into the environment of LIDAR 400 in the direction illustrated by arrow 404. In this example, as mirror 434 is rotated (e.g., about an axis that extends through the page), emitted light 402a may be steered to have a different direction than that illustrated by arrow 404. For example, the direction 404 of emitted light 402a could be adjusted based on the rotational position of triangular mirror 434.

Figure 4C:
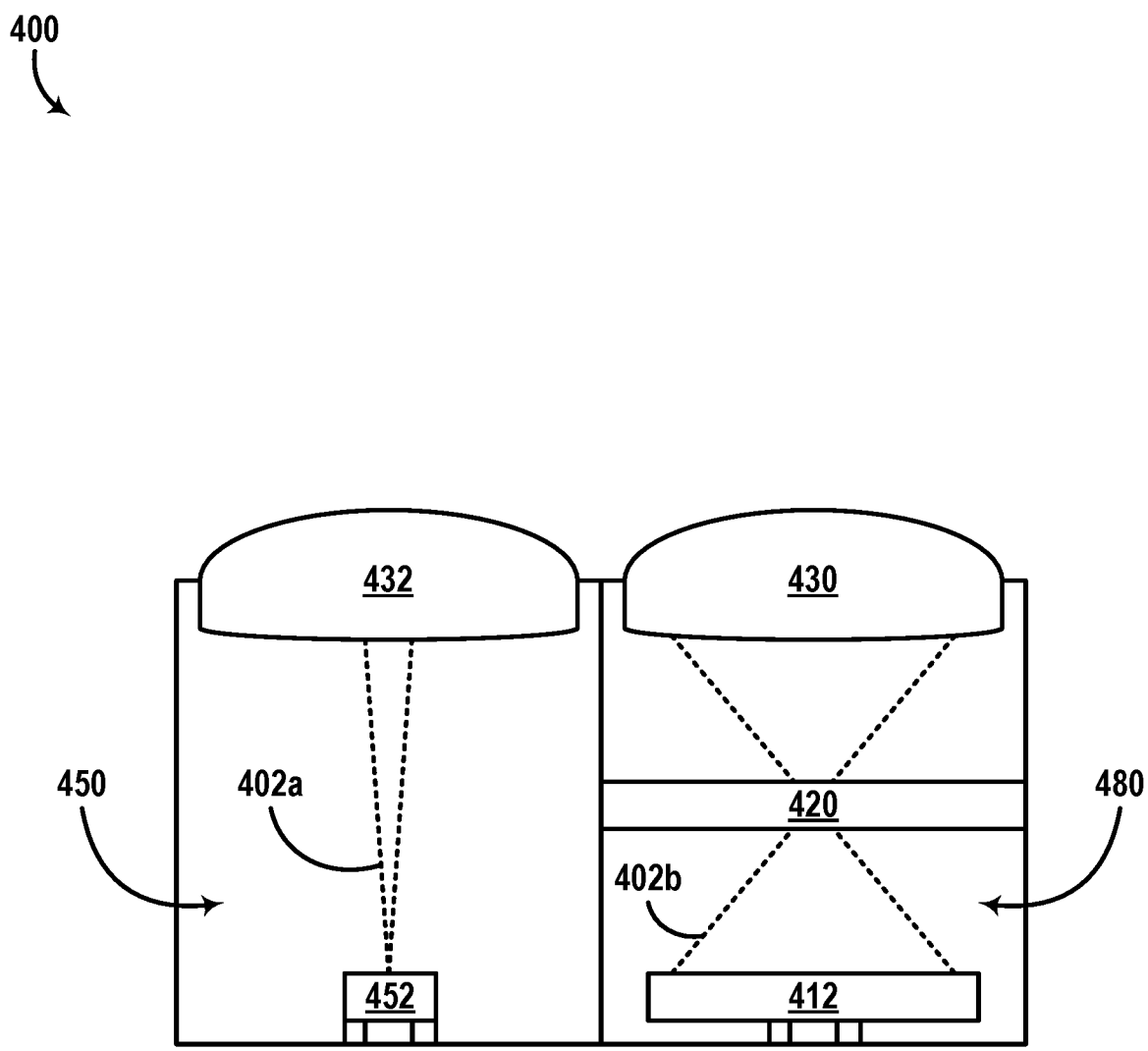
FIG. 4C illustrates another partial cross-section view of the LIDAR device of FIG. 4A, according to example embodiments.

FIG. 4C illustrates another partial cross-section view of LIDAR device 400. For purposes of illustration, FIG. 4C shows x-y-z orthogonal direction axes, where the x-axis and the y-axis are parallel to the surface of the page. It is noted that some of the components of LIDAR 400 are omitted from the illustration of FIG. 4C for convenience in description.

As shown, receiver 480 includes an opaque material 420 and one or more light detectors 412, which may be similar, respectively, to opaque material 120 and detector(s) 112 of system 100. For example, receive lens 430 may be configured to focus light received from the environment of LIDAR 400 toward an aperture of opaque material 420, and at least a portion of the focused light may be transmitted through the aperture as diverging light 402b for detection by detector(s) 412.

In some implementations, LIDAR device 400 may have a bistatic configuration. For example, as shown in FIG. 4C, transmitter 450 and receiver 480 may be disposed at spatially offset positions relative to one another. For instance, as shown, emitted light 402a exits through transmit lens 432 from a first spatial position of transmit lens 432, and received light 402b is intercepted by receive lens 430 from a second spatial position of receive lens 430 that is laterally displaced (e.g., spatially offset) from the first spatial position of transmit lens 432.

In some implementations, LIDAR device 400 may be coupled to a system that moves relative to an object scanned by LIDAR device 400. Referring back to FIG. 2 for example, system 200 may be include or may be mounted on a moving vehicle, such as a car, bus, train, boat, aerial vehicle, or any other type of moving vehicle that moves relative to object 240. In this example, LIDAR device 400 may be included in system 200 (e.g., instead of or in addition to the various components 210, 220, 230, 250, and/or 270 shown in FIG. 2). Thus, in this example, LIDAR device 400 may move relative to object 240 in response to a movement of system 200 relative to object 240.

In these implementations, transmit lens 432 of LIDAR device 400 may be configured to transmit light for illuminating the object. For example, referring back to FIG. 4B, transmit lens 432 of LIDAR 400 can direct light 402a, via rotatable mirror 434, out of LIDAR 400 as light 202 (shown in FIG. 2) that illuminates object 240. Additionally, in this example, a portion of the transmitted light may reflect back from object 240 toward LIDAR 400. Rotatable mirror 434 may then reflect the received light toward receive lens 430 (shown in FIG. 4C), and receive lens 430 may then focus incident light thereon toward spatial filter 420 (i.e., optical material 420).

III. Example Aperture Arrangements

As noted above, in some scenarios, measurements obtained using optical scanning sensors (e.g., LIDARs 200, 300, 400, etc.) may be affected by parallax associated with an offset between the line-of-sight (LOS) of a transmitter that emits a light signal and the LOS of a receiver that detects reflections of the emitted signal. In general, parallax is a displacement or difference in the apparent position of an object viewed along two different lines-of-sight.

For example, a first apparent position of an object in the environment of LIDAR 400 when viewed from a location of transmit lens 432 may be different than a second apparent position of the same object when viewed from a location of receive lens 430. The direction of the displacement between the two apparent positions may depend on the direction of the displacement between the two respective locations of lenses 432 and 430. For example, the first apparent position of the object (from the perspective of lens 432) may appear to be shifted in the direction of the x-axis as compared to the second apparent position of the object (from the perspective of lens 430).

Additionally, an extent of the displacement between the two apparent positions of the object may depend on a distance between the locations of the two lenses 430, 432; as well as a distance between LIDAR 400 and the object. For example, if the distance to the object is substantially greater (e.g., more than one meter away, etc.) than the distance between the lenses 430, 432 (e.g., five millimeters, etc.), then light propagating from the object may appear to be from substantially similar directions in the perspectives of lenses 430, 432. Thus, the apparent positions of "distant" objects (e.g., "distant" as compared to the distance between the two viewpoints) may be substantially similar. Whereas, if the object is near LIDAR 400 (e.g., less than one meter away), then the difference between the two apparent positions may be relatively higher. For instance, a "near" object (e.g., "near" as compared to the distance between the two viewpoints) may appear to be on a right side of a scene when viewed from the location of lens 432; and on a left side of the scene when viewed from the location of lens 430.

Figure 5:
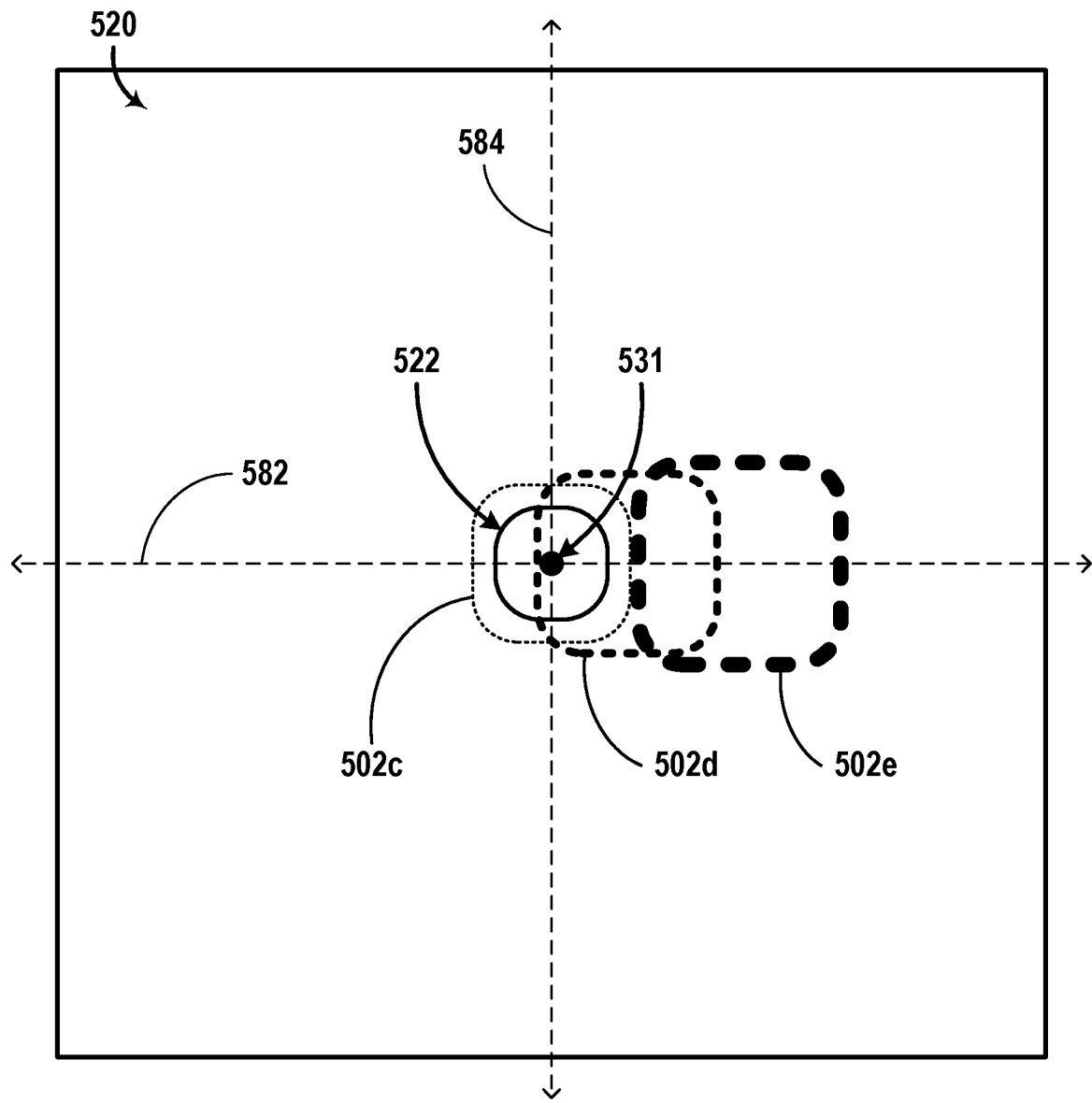
FIG. 5 is an illustration of an opaque material that defines a single aperture, according to example embodiments.

FIG. 5 illustrates an opaque material 520 having a single aperture 522. Opaque material 520 and aperture 522 may be similar, respectively, to opaque material 120 and aperture 122. However, unlike aperture 122, aperture 522 is shown to have a rectangular shape with rounded edges. As noted above, aperture 522 could alternatively have a different shape as well.

An example scenario that describes the effect of parallax on the operation of an optical scanning system (e.g., system 100, LIDARs 200, 300, 400, etc.) follows. In the scenario, opaque material 520 may be employed in LIDAR 400 instead of opaque material 420. Thus, in the scenario, a first axis 582 of opaque material 520 may be parallel the x-axis shown in FIG. 4C. Further, a second axis 584 of opaque material 520 orthogonal to axis 582 (and intersects with axis 582 at a location of aperture 522) may be parallel to the z-axis shown in FIG. 4C.

In the scenario, aperture 522 may be positioned to intersect an optical axis of lens 430. For instance, the optical axis of lens 430 may correspond to axis 531 in FIG. 5 (extending out of the page of FIG. 5 in a direction that is parallel to the y-axis shown in FIG. 4C). For instance, opaque material 520 may be disposed at or near a focal plane of lens 430, and thus aperture 522 may be aligned with a "focus" of lens 430 or the focal point of lens 430 where optical axis 531 intersects the focal plane. As such, contour 502c may correspond to a region of opaque material 520 on which lens 430 focuses light from "distant" objects (e.g., more than one meter away from LIDAR 400, etc.). For instance, in the scenario, emitted light 402a may reflect off the distant object and return to lens 430 from a direction that is substantially parallel to optical axis 531. Thus, as shown in FIG. 5, the location of aperture 522 may be selected to receive a relatively large portion of light reflected off far-field objects (e.g., that are more than one meter away from LIDAR 400) within the region of the environment illuminated by transmitter 450.

In the embodiment shown, aperture 522 is shaped to fit within contour 502c. In alternative embodiments, aperture 522 can be shaped to overlap a larger portion of contour 502c and/or to overlap all of contour 502c.

In this scenario, due to parallax, portions of emitted light 402a that reflect off "near" objects (e.g., objects that are less than one meter or other threshold distance to the LIDAR) may be focused by lens 430 toward an image plane that is at a greater distance to lens 430 than the focal plane. For example, contour 502d may represent a region of opaque material 520 on which lens 430 projects reflections of emitted light 402a from a "near" object. As shown, the projected light indicated by contour 502d is less aligned with primary aperture 522 (as compared to the projected light indicated by contour 502c). For instance, the position of contour 502d is shown to be shifted horizontally (relative to contour 502c).

Further, in the scenario shown, the parallax-shifted light indicated by contour 502d may be projected over a larger area of the surface of spatial filter 520. For instance, the projected light could appear blurred (e.g., out-of-focus, etc.) at the focal plane (or other plane where spatial filter 520 is located).

As noted above, the direction of the parallax shift between contours 502c and 502d may be based on the difference between the positions of transmit lens 432 and receive lens 430 (i.e., in the x-direction shown by the x-axis of FIG. 4C and axis 582 of FIG. 5). For example, in a scenario where opaque material 520 is employed with LIDAR 300 instead of LIDAR 400, the parallax shift between contours 502c and 502d could instead be along a different direction (e.g., along a vertical axis 584, etc.) due to the different (vertical) displacement between the positions of transmitter 350 and receiver 380 in LIDAR 300.

Continuing with the scenario of FIG. 5, contour 502e may correspond to a region of opaque material 520 on which light from another "near" object (closer to LIDAR 400 than the object associated with contour 502d) is projected by lens 430. Thus, an extent of the parallax distortion (e.g., positional shifting, image blurring, etc.) at the plane where spatial filter 520 is located may vary based on the distance between the reflecting object and the LIDAR. For instance, in this scenario, the extent of the distortion of contour 502e (relative to contour 502c) may be greater than that of contour 502d (because the object associated with contour 502e is closer to the LIDAR than the object associated with contour 502d). Additionally, contour 502e may be shifted in a manner such that it does not even intersect with primary aperture 522, as shown in FIG. 5.

Due to parallax, in this scenario, a smaller portion of the reflected light from "near" objects to be transmitted through aperture 522 (as compared to the portion of reflected light from "distant" objects transmitted through aperture 522).

Accordingly, example embodiments are disclosed herein for mitigating the effect of parallax on optical scanning systems (e.g., system 100, LIDARs 200, 300, 400, etc.).

Figure 6:
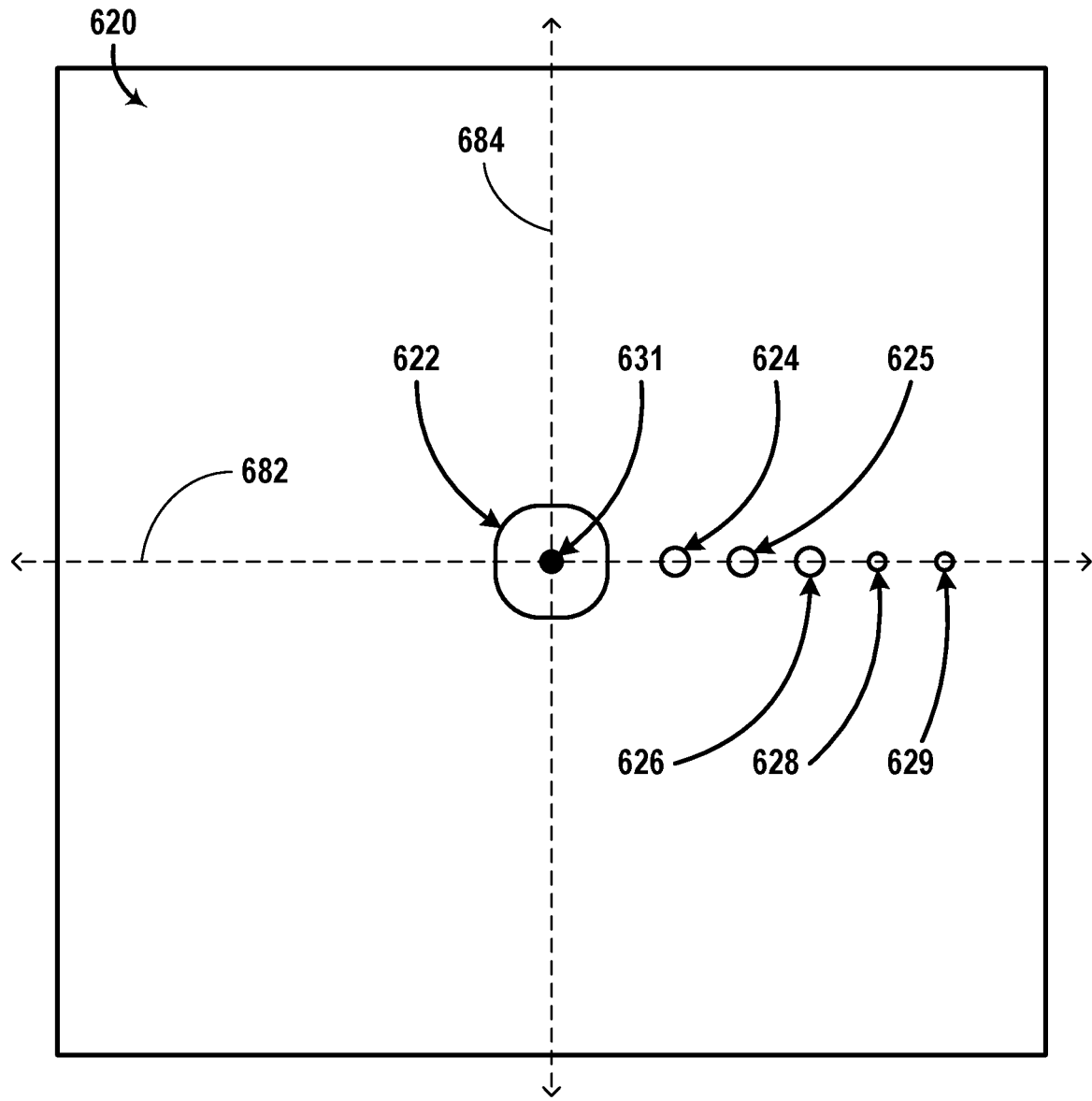
FIG. 6 is an illustration of an opaque material that defines multiple apertures, according to example embodiments.

FIG. 6 illustrates an opaque material 620 that defines a plurality of apertures 622, 624, 625, 626, 628, 629, according to example embodiments. Opaque material 620 may be similar to any of opaque materials 120, 420, 520, and may be employed with an optical system such as system 100 and/or LIDAR devices 200, 300, 400, etc. Additionally, the apertures 622, 624, 625, 626, 628, 629 may be implemented similarly to any of apertures 122 and 522. Further, axes 682, 684, and 631, may be similar, respectively, to axes 582, 584, and 531 of FIG. 5.

As shown, rather than a single aperture, opaque material 620 defines a plurality of apertures including a primary aperture 622 and one or more secondary apertures 624, 625, 626, 628, 629. With this arrangement, a device or system herein can use opaque material 620 to transmit focused light (e.g., from lens 130, 230, 330, 430, etc.) toward one or more light detectors (e.g., array 110, detector 112, detector(s) 412, etc.) through at least one of the plurality of apertures. To that end, as shown, secondary apertures 624, 625, 626, 628, 629 are positioned at off-axis (e.g., out of focus positions) as compared to the position of primary aperture 622. Thus, for instance, in a scenario where light reflected by a "near" object is focused (and/or projected), due to parallax, by a receive lens (e.g., lens 430) onto regions of transparent material 620 that do not overlap with primary aperture 622 (e.g., the regions described as contours 502d and 502e in FIG. 5), portion(s) of the distorted focused light can still be transmitted to the light detector(s) (e.g., array 110, detector(s) 112, 412, etc.) via the secondary apertures. Thus, opaque material 620 is an example embodiment herein for mitigating the effect of parallax in the operation of system 100, and/or LIDARs 200, 300, 400, etc.

In some examples, a cross-sectional area of the light detector(s) (e.g., array 110, detector(s) 112, 412, etc.) that receive diverging light transmitted through at least one of the plurality of apertures 622, 624, 625, 626, 628, 629 may be greater than a sum of cross-sectional areas of the plurality of apertures. Thus, for instance, a system herein may employ opaque material 620 to reduce detection of noise while increasing the detection area available for detecting the diverging light transmitted through one or more of the plurality of apertures.

In some examples, the sizes of the various apertures can be varied to control the amount of light transmitted through opaque material 620.

In a first example, a size of the primary aperture is greater than a respective size of each secondary aperture of the one or more secondary apertures. For instance, as shown, primary aperture 622 may be larger than each of secondary apertures 624, 625, 626, 628, 629.

In a second example, the primary aperture has a first size, a first secondary aperture of the one or more secondary apertures has a second size, and a second secondary aperture of the one or more secondary apertures has a third size. For instance, as shown, primary aperture 622 has a first size that is larger than a second size of secondary apertures 624, 625, 626; and secondary apertures 628, 629 have a third size that is even smaller than the second size.

Alternatively, in a third example, the primary aperture may have a first size, and each secondary aperture may have a second (same) size. Thus, although not shown, all the secondary apertures 624, 625, 626, 628, 629 could alternatively have a same (second) size that is smaller than the first size of primary aperture 622.

In a fourth example, as a variation of the second example, the first secondary aperture may be at a first distance to the primary aperture, the second secondary aperture may be at a second distance to the primary aperture greater than the first distance, and the second size of the first secondary aperture may be greater than the third size. For instance, as shown, secondary aperture 624 has a larger (second) size than the (third) size of secondary aperture 629, and is at a smaller (first) distance to primary aperture 622 than the (second) distance between primary aperture 622 and secondary aperture 629. Thus, with this arrangement, further secondary apertures can be smaller to reduce the amount of noise transmitted to the light detectors because, in the event of parallax associated with a "near" object to the LIDAR, it may be likely that other secondary apertures closer to the primary aperture may also transmit portions of the parallax-shifted focused light reflected from the "near" object.

In one embodiment, primary aperture 622 may have a width of 250 μm horizontally (i.e., in the direction of axis 682) and a length of 100 μm vertically (i.e., in the direction of axis 684); secondary apertures 624, 625, 626 may have a diameter of 60 μm; and secondary apertures 628, 629 may have a diameter of 40 μm. Further, in this embodiment, the respective distances between a position of primary aperture 622 and respective positions of secondary apertures 624, 625, 626, 628, 629 may be 275 μm, 425 μm, 575 μm, 725 μm, and 875 μm. In alternative embodiments, the sizes and positions of the various apertures may vary from the example sizes and positions described above.

In some examples, the secondary apertures can be arranged according to an expected direction of a parallax shift in a system that employs the apertures.

In a first example, where a LIDAR transmitter emits light to illuminate a scene and reflections of the emitted light are focused by a receive lens (e.g., lens 130, 230, 330, 430, etc.) toward opaque material 620, the one or more secondary apertures may be arranged in the opaque material based on a position of the LIDAR transmitter relative to a position of the receive lens. Referring back to FIG. 4C for instance, opaque material 620 may be configured for use with LIDAR device 400. In this instance, a position of receive lens 430 is displaced along the positive x-axis direction (e.g., axis 682 in FIG. 6) relative to a position of transmitter 460. Thus, in this instance, secondary apertures 624, 625, 626, 628, 629 may be arranged in offset positions along a similar direction of the x-axis (i.e., axis 682) (e.g., so as to intercept light according to an expected path of the parallax shift in that particular LIDAR arrangement).

Alternatively or additionally, in a second example, the primary aperture may be at a given distance to a particular side of the opaque material, and each of the one or more secondary apertures may be at greater than the given distance to the particular side of the opaque material. For instance, as shown in FIG. 6, primary aperture 622 is at a given distance to side 620a of opaque material 620a; and each of secondary apertures 624, 625, 626, 628, 629 is at greater than the given distance to side 620a.

Figure 7:
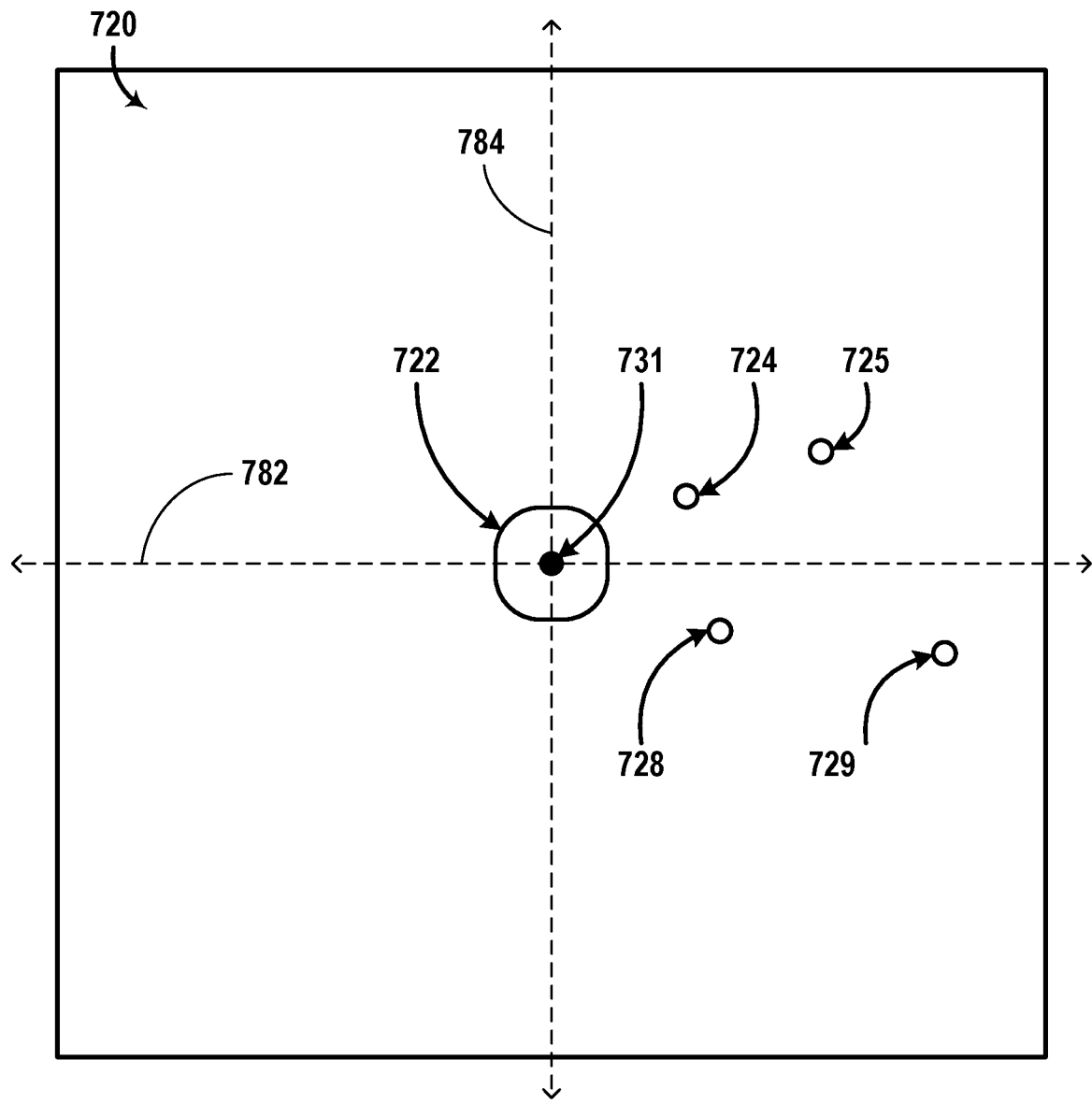
FIG. 7 is an illustration of another opaque material that defines multiple apertures, according to example embodiments.

FIG. 7 illustrates another opaque material 720 that defines a plurality of apertures 722, 724, 725, 728, 729, according to example embodiments. Opaque material 720 may be similar to any of opaque materials 120, 420, 520, 620, and may be employed with an optical system such as system 100 and/or LIDAR devices 200, 300, 400, etc. Additionally, apertures 722, 724, 725, 728, 729 may be implemented similarly to any of apertures 122 and 522. Further, axes 782, 784, and 731, may be similar, respectively, to axes 582, 584, and 531 of FIG. 5.

As shown, opaque material 720 defines a plurality of apertures including a primary aperture 722 and one or more secondary apertures 724, 725, 728, 729. As noted above, the plurality of apertures can be arranged in a variety of ways.

In some examples, the primary aperture of opaque material 720 may have a vertical axis and a horizontal axis orthogonal to the vertical axis. In these examples, a first secondary aperture of the one or more secondary apertures may be positioned above the horizontal axis of the primary aperture, and a second secondary aperture of the one or more secondary apertures may be positioned below the horizontal axis. For instance, as shown, axis 784 may correspond to the vertical axis of primary aperture 722 and axis 782 may correspond to the horizontal axis of primary aperture 722. In this instance, as shown, the first secondary aperture 724 is positioned above horizontal axis 782, and the second secondary aperture 728 is positioned below horizontal axis 782.

Additionally or alternatively, in some examples, a spatial filter (e.g., opaque material 720, etc.) may include: at least two secondary apertures in a first linear arrangement between the vertical axis and the horizontal axis, and at least two other secondary apertures in a second linear arrangement between the vertical axis and the horizontal axis. For instance, in the embodiment shown, secondary apertures 724 and 725 are positioned above axis 782 and secondary apertures 728 and 729 are positioned below axis 782. For instance, one or more of secondary apertures 724, 725, 728, 729 may still overlap contours 502d and/or 502e (shown in FIG. 5) without necessarily being in the linear arrangement shown for the secondary apertures 624, 625, 626, 628, 629 in FIG. 6. Other secondary aperture arrangements are possible.

Further, in some instances, the secondary apertures can be selected at locations that are less susceptible to receiving ambient light (or other background noise) focused by optical elements in a system (e.g., system 100, LIDARs 200, 300, 400, etc.) that employs opaque material 720. Referring back to FIG. 4C for instance, consider a scenario where opaque material 720 is used in LIDAR 400 instead of opaque material 420. In this scenario, an optical cavity of transmitter 450 (and/or receiver 480) and/or one or more other components of LIDAR 400 (e.g., lens 430, 432, etc.) may divert (e.g., scatter, deflect, reflect, etc.) portions of the transmitted light beam 402a (and/or the received light beam 402). As a result, the diverted light may be focused by lens 430 away from primary aperture 722 (e.g., toward a region of opaque material 720 that does not overlap primary aperture 722, etc.). Further, in this scenario, the locations of such (diverted) noise signals, when focused by lens 430 toward spatial filter 720, may be expected to be along axis 782. Thus, to allow transmission of parallax-shifted light signals through opaque material 720 while also reducing the amount of noise signals transmitted through the opaque material, secondary apertures 724, 725, 728, 729 can be arranged away from the expected locations where noise signals are diverted away from primary aperture 722.

In some implementations, opaque material 720 may be configured as a spatial filter 720 that transmits one or more portions of focused light incident thereon (e.g., focused by receive lens 430, etc.) through the spatial filter 720.

In these implementations, primary aperture 722 may be configured as a primary pinhole 722 that is arranged (e.g., along a focal axis of receive lens 430, etc.) to transmit, through the spatial filter 720, at least a threshold portion of the focused light based on an object associated with the focused light (e.g., object 240 of FIG. 2 which reflects incident light back to the LIDAR device of system 200, etc.) being at greater than a threshold distance to the LIDAR device. Referring back to FIG. 5 for instance, reflected light from an object that is at greater than the threshold distance (e.g., greater than one meter away from the LIDAR device) may be focused in a region of spatial filter 520 that is substantially similar to contour 502c. In this way, the at least threshold portion of the focused light (e.g., portion of contour 502c that overlaps primary pinhole 522) may be transmitted through primary pinhole 522. In one embodiment, the threshold portion transmitted through primary pinhole 522 is at least approximately 85% (e.g., 87%, 89%, etc.) of the focused light. Other threshold portions are possible as well.

In these implementations, secondary apertures 724, 725, 728, 729 may be configured as secondary pinholes 724, 725, 728, 729 that are arranged to transmit, through the spatial filter 720, one or more portions of the focused light based on the object (e.g., object 240) being at less than the threshold distance to the LIDAR device. Referring back to FIG. 5 for instance, as the object becomes nearer to the LIDAR device of spatial filter 720, the image of the object on the focal plane may correspond to contour 502d. Further, as the object becomes even nearer, the image may correspond to contour 502e, and so on. Thus, in this example, depending on the range of the object (i.e., distance between the object and the LIDAR device), portion(s) of the parallax-shifted image of the object may begin to overlap one or more of secondary pinholes 724, 725, 728, and/or 729. In this way, the secondary pinhole(s) can transmit respective portions of the (parallax-shifted) focused light incident thereon through the spatial filter 720.

In some examples, spatial filter 720 is configured to select a portion of the focused light incident thereon (e.g., a reflected light pulse received from an object scanned by a LIDAR device that includes spatial filter 720). In these examples, an intensity of the selected portion may be associated with a distance between the object and the LIDAR system.

In a first example, if the object is within a first range of distances greater than the threshold distance, an intensity of the selected portion may decrease as the distance to the object increases. In one embodiment, the intensity of the selected portion may decrease by a factor of $1/R^2$ (where R is the distance between the LIDAR and the object). For instance, if the object is at any distance within the first range of distances, then the reflected light pulse may be focused by the LIDAR toward approximately the same region of spatial filter 720 where the primary pinhole is located (e.g., similarly to contour 502c of FIG. 5). As noted above, parallax shifting is expected to be minimal when scanning relatively distant objects.

In a second example, if the object is within a second range of distances less than the threshold distance, the intensity of the selected portion may decrease as the distance to the object decreases. For instance, if the object is at any distance within the second range of distances, the reflected light pulse may be focused toward a parallax-shifted position on spatial filter 720, such as the parallax-shifted positions indicated by contours 502d and 502e of FIG. 5. As a result, a smaller portion (or none) of the reflected light pulse may overlap primary pinhole 722 (due to parallax).

Accordingly, in some implementations, the sizes and/or positions of the secondary pinholes 724, 725, 728, 729 can be configured to associate object distance with signal intensity of the focused light portion selected by the spatial filter. For instance, the expected locations (e.g., contours 502d, 502e) and other properties (e.g., spot size, intensity distribution, etc.) of the parallax-shifted focused light on a surface of the spatial filter (that was reflected by an object in the second range of distances) can be computed (e.g., simulated based on optical characteristics of the LIDAR such as relative positions of the transmitter and the receiver, etc.), or measured (e.g., by moving an object near the LIDAR while collecting measurements, etc.). Based on this information, the sizes and/or locations of the secondary pinholes can be adjusted to achieve a desired LIDAR system response behavior when the object is within the second range of distances. In one implementation, based on the object being within the second range of distances, the intensity of the focused light portions selected by spatial filter 720 may decrease as the object in response to a decrease in the distance between the object and the LIDAR.

In a third example, if the object is at any distance within a third range of distances less than the threshold distance (and different than the second range of distances), the intensity of the selected portion from the spatial filter may correspond to a given intensity (or within a threshold tolerance error from the given intensity). For instance, the LIDAR system may be configured to provide a "flat" or "constant" system response when the object any distance within the third range of distances.

Figure 8:
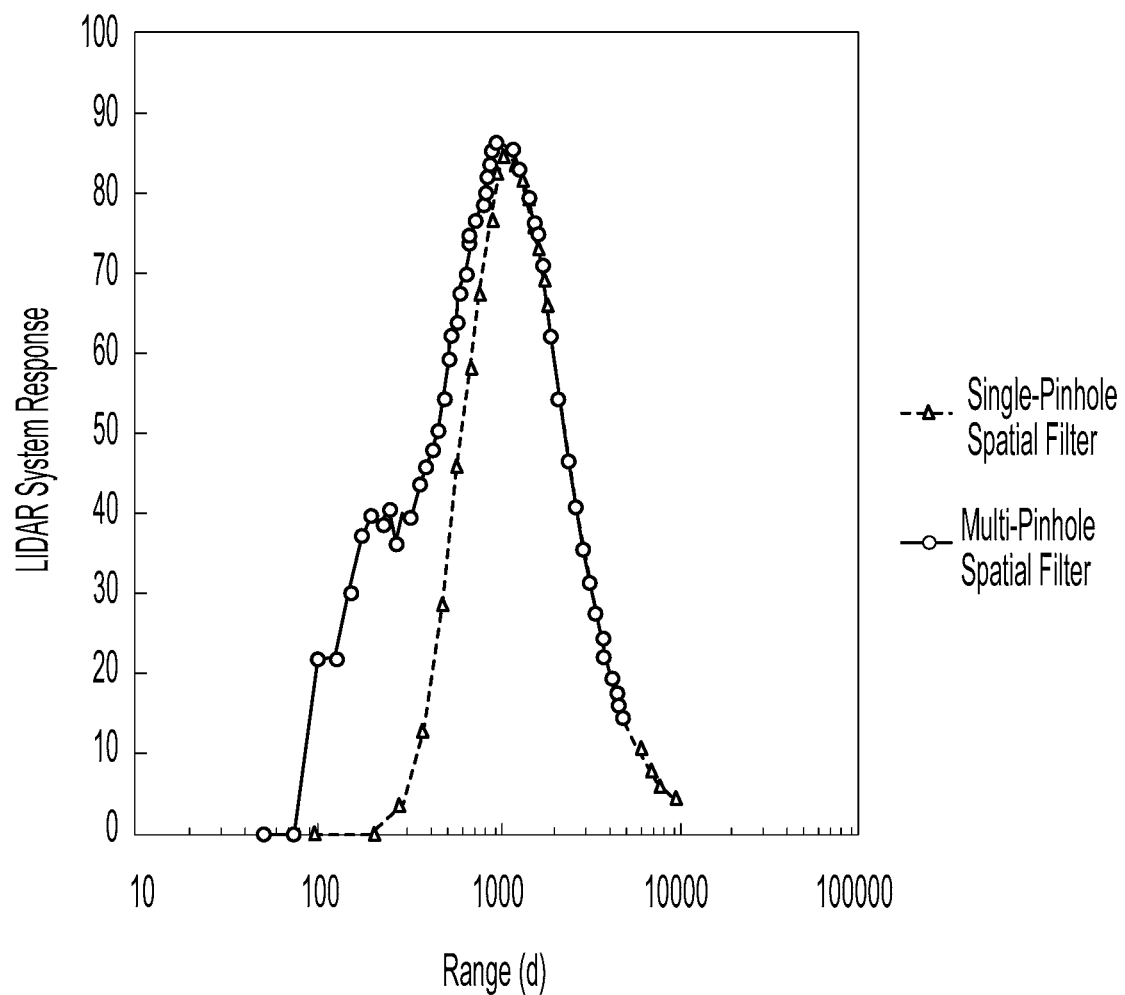
FIG. 8 is a conceptual illustration of LIDAR system responses, according to an example embodiment.

FIG. 8 is a conceptual illustration of LIDAR system responses, according to an example embodiment.

In FIG. 8, the values along the horizontal axis represent distances (or "ranges") to an object (or "target") scanned by a LIDAR. For convenience in description, the range values in the horizontal axis are scaled by a factor of d. In one embodiment, d corresponds to one millimeter. In this embodiment, a range of 100 in the horizontal axis may correspond to a distance of 100d=100 millimeters. In other embodiments, d may correspond to a different scaling factor.

In FIG. 8, the values along the vertical axis represent LIDAR system responses expected when the LIDAR scans an object located at corresponding ranges. For example, the conceptual LIDAR system responses indicated in FIG. 8 may each represent a (scaled) ratio of receive signal power (e.g., intensity of a reflected light pulse detected by the LIDAR system) to corresponding transmit signal power (e.g., intensity of the corresponding emitted light pulse which was reflected back to the LIDAR system). For convenience in description, the system responses represented by FIG. 8 are scaled to correspond to values between 0 and 100.

In some examples, an emitted light pulse may have a substantially larger number photons of energy than a portion of the corresponding reflected light pulse that is detected by the LIDAR system. In one example, the number of photons in an emitted light pulse could be more than a trillion photons; and the number of photons detected by the LIDAR system from the corresponding reflected light pulse may could range from thousands to millions of photons. Other examples are possible.

It is noted that the system response and range values shown in FIG. 8 are not necessarily accurate, but are only illustrated as shown for the sake of example. Thus, some example LIDAR systems within the scope of the present disclosure may have different LIDAR system responses (and/or different scanning ranges) than shown.

In some examples, LIDAR system responses can be measured or characterized (e.g., as part of manufacturing testing, during calibration, etc.). In other examples, the LIDAR system responses can be computed or simulated using a computer based on optical properties of the LIDAR system, such as the relative positions of various LIDAR components (e.g., LIDAR transmitter, LIDAR receiver, spatial filter, pinholes, lenses, mirrors, etc.), and/or the optical characteristics of the various LIDAR components (e.g., transmit and/or receive lens focal distance, light detector sensitivity, etc.).

FIG. 8 shows conceptual LIDAR system responses of: a LIDAR system equipped with a single-pinhole spatial filter (e.g., similar to opaque material 520); and another LIDAR system equipped with a multi-pinhole spatial filter (e.g., similar to opaque material 720).

As shown, both spatial filters may be associated with similar LIDAR system responses when scanning an object located at greater than a threshold distance (e.g., 1000d) away from the respective LIDARs. As noted above, objects scanned at these "far" ranges may be less susceptible to the effects of parallax. For example, the system responses of both LIDARs (e.g., at distances greater than 1000d) may be expected to have a uniform relationship with the actual distance to the object (e.g., system response may be inversely proportional to the square distance between the LIDAR and the object).

Additionally, as shown, both spatial filters are associated with relatively lower LIDAR system responses at closer scanning ranges (e.g., while a LIDAR is scanning an object less than 1000d away). These lower system response values may be due to the parallax-shift effect described above, which causes a returning light signal from an illuminated object to be focused (at least partially) onto a shifted position on the spatial filter (e.g., contours 502d, 502e, etc.).

In the example shown, the LIDAR equipped with the multi-pinhole spatial filter (e.g., opaque material 720) may have improved LIDAR system responses (e.g., ability to detects) when scanning close range targets (e.g., objects less than 1000d away), as compared to the LIDAR equipped with the single-pinhole spatial filter (e.g., opaque material 520). This is shown in FIG. 8 by the generally higher system response values of the multi-pinhole spatial filter equipped LIDAR when scanning objects located 10d-1000d away (as compared with the single-pinhole equipped LIDAR). For instance, in the scenario of FIG. 8, the LIDAR of the multi-pinhole spatial filter detected a signal (e.g., system response of approximately 40) from an object that is 200d away; whereas the other LIDAR of the single-pinhole spatial filter did not detect any signal (e.g., system response=0) from that same (200d) range.

In some examples, a LIDAR system herein (e.g., LIDARs 200, 300, 400, etc.) may be configured to scan an object (e.g., object 240) according to one of a plurality of system response configurations.

In a first example, the LIDAR system may scan the object according to a first system response configuration based on the object being within a first range of distances from the LIDAR system greater than a threshold distance. For instance, in the scenario of FIG. 8, the first range of distances may correspond to a scanning range interval that is greater than an example threshold distance of 1000d (e.g., 1000 millimeters, etc.) away from the LIDAR system. In this example, the LIDAR system may scan the object according to the first system response configuration (e.g., a system response that is inversely proportional to the squared distance to the object, etc.). Thus, while operating according to the first system response configuration, the LIDAR system may be configured to provide an output indicative of the distance from the LIDAR system to the object.

In some implementations, the LIDAR system may include a spatial filter (e.g., opaque material 720) configured to transmit, based on the object being at a distance within the first range of distances, at least a portion of focused light from the object having an intensity indicative of the distance from the LIDAR system to the object. For instance, a primary pinhole (e.g., primary apertures 522, 622, 722, etc.) of the spatial filter can be positioned along a focal axis of a receive lens of the LIDAR to receive signals from "far-field" ranges (e.g., more than 1000 millimeters away in the example of FIG. 8).

In a second example, the LIDAR system may scan the object according to a second system response configuration based on the object being within a second range of distances less than the threshold distance. For instance, as shown in FIG. 8, the LIDAR system may provide system responses that vary according to object distance for objects located within the 400-1000 range interval (e.g., system responses increase as the distance to the object increases). To facilitate this, the positions and/or sizes of the secondary apertures of the spatial filter may be based on optical characteristics of the LIDAR system (and/or one or more components thereof). Referring back to FIG. 7 for instance, the sizes and/or locations of secondary apertures 724, 725, 728, 729 can be based on expected parallax-shifted optical paths (e.g., contours 502e and 502d) of light focused from objects that are located within the second range of distances to the LIDAR system.

In a third example, the LIDAR system may scan the object according to a third system response configuration based on the object being within a third range of distances from the LIDAR system.

In some implementations, the third range of distances may be less than the threshold distance, and/or less than the second range of distances. As shown in FIG. 8 for instance, the LIDAR of the multi-pinhole spatial filter may provide a near-constant or flat system response when scanning objects in the 200-400 range interval. Thus, in this instance, the LIDAR may be configured to output a nearly constant receive signal when scanning objects that are at any distance within the 200-400 range interval. Thus, with the third system response configuration, the LIDAR system can ensure that the portion of the reflected signal intercepted by the light detectors is sufficiently high (e.g., system response value of at least 38) regardless of actual object distance within the third range of distances. For instance, the third system response configuration may allow the LIDAR system to distinguish returning light pulses from background noise when scanning near objects (e.g., the 200-400 range interval).

In other implementations, the third range of distances (associated with the "flat" or "constant" system response) can be alternatively greater than the threshold distance, and/or alternatively greater than the second range of distances. Thus, within examples, sizes and/or positions of secondary pinholes can be varied in different ways to achieve different types of LIDAR system responses at different LIDAR scanning ranges.

In some examples, the plurality of system response configurations of a LIDAR system can be selected according to an application of the LIDAR system (e.g., vehicle-mounted LIDAR, robotic platform mounted LIDAR, LIDARs used in indoor environments, LIDARs used in outdoor environments, LIDARs mounted on a specific portion of a system such as a top side of a vehicle or a front side of a vehicle, etc.). For example, a LIDAR system employed in a vehicle may have different system response configurations (e.g., system response behaviors for certain scanning ranges) than a LIDAR system employed in an indoor setting.

In some examples, a system herein (e.g., system 100, LIDARs 200, 300, 400, etc.) may be configured to adjust one or more of the plurality of system response configurations based on a control signal (and/or other input). The control signal, for instance, can be provided by a controller (e.g., controller 270) or another computing device.

In one example, system 100 may move (e.g., via an actuator, etc.) spatial filter 120 toward lens 130, away from lens 130, and/or horizontally (e.g., along the focal plane of lens 130, etc.) to adjust the positions of one or more apertures thereon (e.g., aperture 122) relative to lens 130. In this example, the system response configurations relative to particular scanning ranges of system 100 may be adjusted. Alternatively or additionally, lens 130 and/or detector array 110 may be moved relative to spatial filter 120.

In another example, LIDAR 200 may replace opaque material 220 with a different opaque material associated with different system response configurations. For instance, controller 270 may operate an actuator to interpose a different spatial filter (not shown in FIG. 2) having a different number or arrangement of apertures between lens 230 and detector 210.

Figure 9:
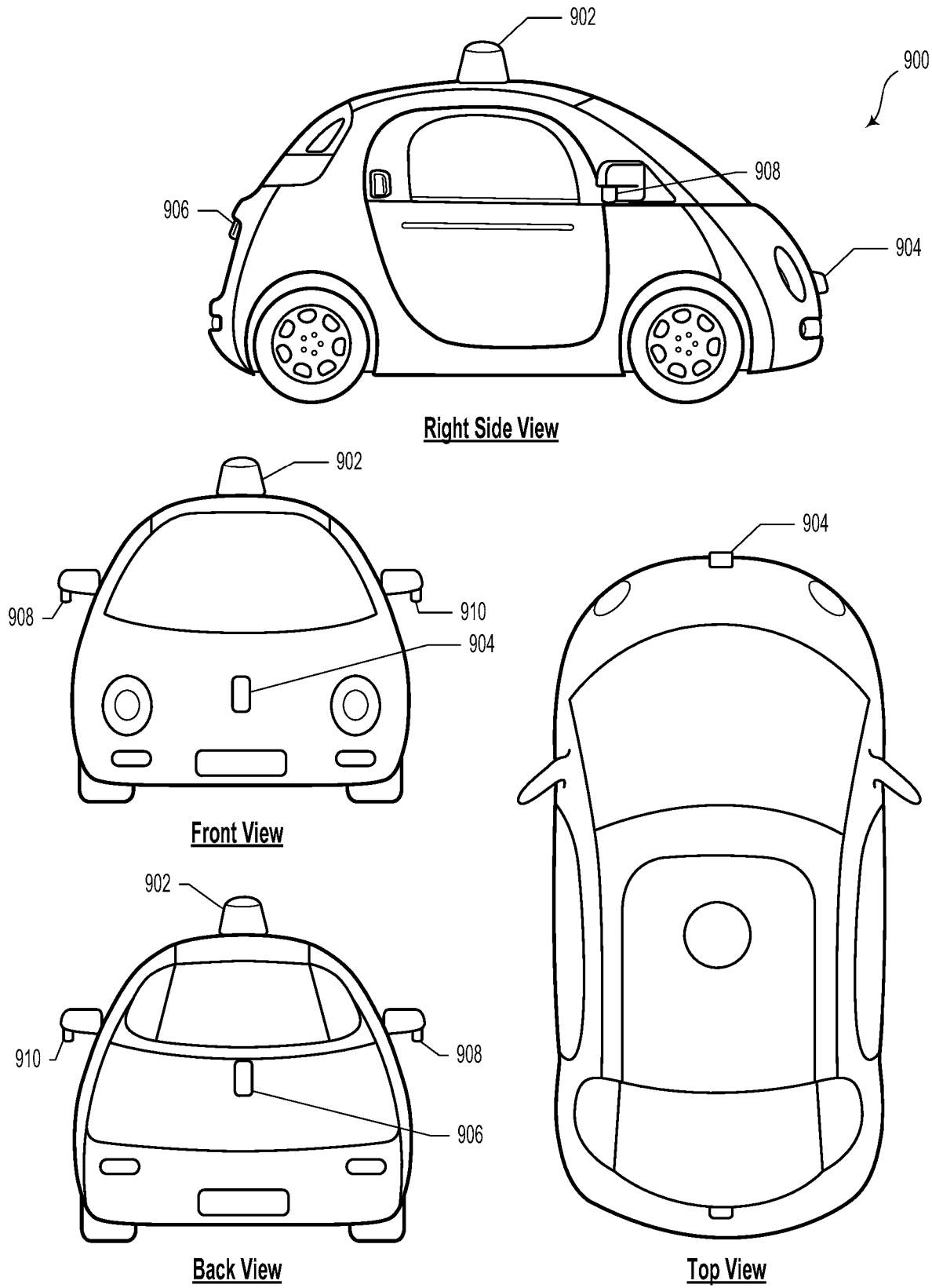
FIG. 9 illustrates a vehicle, according to example embodiments.

FIG. 9 illustrates a vehicle, according to an example embodiment. The vehicle 900 may include one or more sensor systems 902, 904, 906, 908, and 910. The one or more sensor systems 902, 904, 906, 908, and 910 could be similar or identical to system 100, LIDARs 200, 300, and/or 400.

One or more of the sensor systems 902, 904, 906, 908, and 910 may be configured to rotate about an axis (e.g., the z-axis) perpendicular to the given plane so as to illuminate an environment around the vehicle 900 with light pulses. Based on detecting various aspects of reflected light pulses (e.g., the elapsed time of flight, polarization, etc.), information about the environment may be determined.

In an example embodiment, sensor systems 902, 904, 906, 908, and 910 may be configured to provide respective point cloud information that may relate to physical objects within the environment of the vehicle 900. While vehicle 900 and sensor systems 902, 904, 906, 908, and 910 are illustrated as including certain features, it will be understood that other types of systems are contemplated within the scope of the present disclosure.

In some implementations, one or more of spatial filters (opaque materials) 120, 220, 420, 520, 620, and/or 720 may be disposed at the focal plane of a lens (e.g., lens 130, 230, 330, 430, etc.). Alternatively, in other implementations, a system herein may include any of these spatial filters disposed at a different location. For example, the spatial filter(s) can be alternatively disposed near the focal plane of the lens, parallel to the focal plane of the lens, at a conjugate plane associated with a portion of the scene that is at a particular distance to the system (e.g., a farthest unambiguous detection range of the LIDAR system), and/or along an image plane associated with a hyperfocal distance from the lens, among other possibilities.

Accordingly, in some examples, a LIDAR system herein (e.g., LIDAR 200, 300, 400, etc.) may include an opaque material (e.g., spatial filter 120, 220, 420, 520, 620, and/or 720) disposed at or near a conjugate plane of a receive lens (e.g., receive lens 130, 230, and/or 430) associated with a predetermined maximum scanning range configuration of the LIDAR system. Referring back to FIG. 2 by way of example, LIDAR 200 may be configured to repeatedly scan a region of the environment that is within an example predetermined maximum scanning range of 30 meters to LIDAR 200. In this example, spatial filter 220 may be disposed at or near a conjugate plane of lens 230 associated with that maximum scanning range of 30 meters. Other examples are possible.

IV. Example Methods

Figure 10:
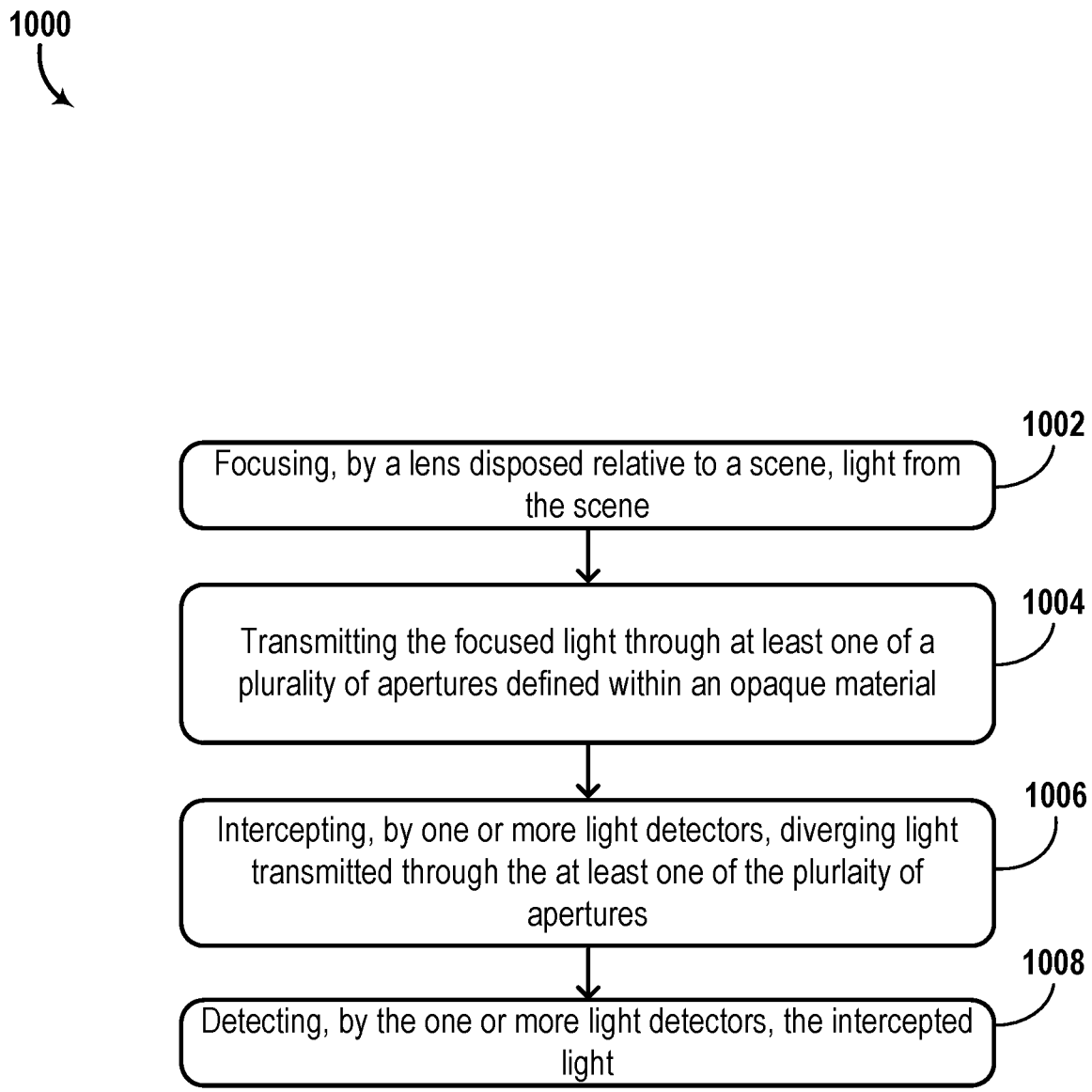
FIG. 10 is a flowchart of a method, according to example embodiments.

FIG. 10 is a flowchart of a method 1000, according to example embodiments. Method 1000 presents an embodiment of a method that could be used with system 100, LIDAR devices 200, 300, 400, opaque materials 520, 620, 720, and/or vehicle 900, for example. Method 1000 may include one or more operations, functions, or actions as illustrated by one or more of blocks 1002-1008. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 1002, method 1000 involves focusing, by a lens (e.g., lens 130) disposed relative to a scene, light from the scene (e.g., light 102) toward a focal plane of the lens.

At block 1004, method 1000 involves transmitting the focused light through at least one of a plurality of apertures defined within an opaque material disposed at the focal plane of the lens. Referring back to FIG. 7 for example, opaque material 720 may be disposed at the focal plane of any of lens 130, 330, and/or 430. In this example, light focused by the lens may be projected onto a surface of opaque material 720 in regions (e.g., similar to any of the regions 502c, 502d, 502e shown in FIG. 5) that overlap (at least partially) one or more of the plurality of apertures 722, 724, 725, 728, 729. Thus, in this example, the one or more apertures may transmit the portion(s) of the focused light projected thereon through opaque material 720.

At block 1006, method 1000 involves intercepting, by one or more light detectors (e.g., array 110, light detector 112, light detector 210, light detector 412, etc.), diverging light (e.g., diverging light 102) transmitted through the at least one of the plurality of apertures.

At block 1008, method 1000 involves detecting, by the one or more light detectors, the intercepted light. As shown in FIG. 1 for example, the light detectors of array 110 may provide an output signal indicative of the intensity of light 102 incident thereon. As another example, referring back to FIG. 4C, a single light detector 412 may instead provide the output signal.

V. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
a lens disposed relative to a scene, wherein the lens is configured to focus light from the scene;
an opaque material wherein the opaque material defines a plurality of apertures including a primary aperture positioned to intersect an optical axis of the lens and a plurality of secondary apertures positioned outside the optical axis, wherein the plurality of secondary apertures include a first secondary aperture at a first distance from the primary aperture and a second secondary aperture at a second distance from the primary aperture, wherein the second distance is greater than the first distance; and
one or more light detectors arranged to intercept diverging light, wherein the diverging light comprises light from the scene focused by the lens that diverges from at least one of the plurality of apertures defined by the opaque material.

2. The system of claim 1, wherein the opaque material is disposed at or near the focal plane of the lens.

3. The system of claim 1, wherein the opaque material is disposed at or near a conjugate plane of the lens associated with a predetermined maximum scanning range configuration of the system.

4. The system of claim 1, wherein a size of the primary aperture is greater than a respective size of each secondary aperture of the plurality of secondary apertures.

5. The system of claim 4, wherein the primary aperture has a first size, wherein each secondary aperture has a second size.

6. The system of claim 4, wherein the primary aperture has a first size, wherein the first secondary aperture has a second size, and wherein the second secondary aperture has a third size.

7. The system of claim 6, wherein the second size of the first secondary aperture is greater than the third size of the second secondary aperture.

8. The system of claim 1, wherein the light from the scene focused by the lens includes light reflected by one or more objects illuminated by a transmitter of a light detection and ranging (LIDAR) device.

9. The system of claim 8, wherein the plurality of secondary apertures are arranged in the opaque material based on a position of the transmitter of the LIDAR device relative to a position of the lens of the system.

10. The system of claim 1, wherein the primary aperture has a vertical axis and a horizontal axis orthogonal to the vertical axis, wherein the first secondary aperture is positioned above the horizontal axis of the primary aperture, and wherein the second secondary aperture is positioned below the horizontal axis of the primary aperture.

11. The system of claim 1, wherein the primary aperture has a vertical axis and a horizontal axis orthogonal to the vertical axis, wherein the plurality of secondary apertures include at least two secondary apertures in a first linear arrangement between the vertical axis and the horizontal axis, and wherein the plurality of secondary apertures include at least two other secondary apertures in a second linear arrangement between the vertical axis and the horizontal axis.

12. The system of claim 1, wherein the one or more light detectors comprise an array of light detectors connected in parallel to one another.

13. The system of claim 1, wherein the one or more light detectors comprise a single sensing element detector.

14. A method comprising:
focusing, by a lens disposed relative to a scene, light from the scene;
transmitting the focused light through at least one of a plurality of apertures defined within an opaque material, wherein the plurality of apertures includes a primary aperture positioned to intersect an optical axis of the lens and a plurality of secondary apertures positioned outside the optical axis, wherein the plurality of secondary apertures include a first secondary aperture at a first distance from the primary aperture and a second secondary aperture at a second distance from the primary aperture, wherein the second distance is greater than the first distance;
intercepting, by one or more light detectors, diverging light, wherein the diverging light comprises light from the scene focused by the lens that diverges from at least one of the plurality of apertures defined by the opaque material; and
detecting, by the one or more light detectors, the intercepted light.

15. A light detection and ranging (LIDAR) device comprising:
a LIDAR transmitter configured to illuminate a scene with light;
a LIDAR receiver configured to receive light reflected by one or more objects within the scene, wherein the LIDAR receiver comprises:
a lens configured to focus the reflected light from the scene;
an opaque material, wherein the opaque material defines a plurality of apertures including a primary aperture positioned to intersect an optical axis of the lens and a plurality of secondary apertures positioned outside the optical axis, wherein the plurality of secondary apertures include a first secondary aperture at a first distance from the primary aperture and a second secondary aperture at a second distance from the primary aperture, wherein the second distance is greater than the first distance; and
one or more light detectors configured to detect diverging light, wherein the diverging light comprises reflected light from the scene focused by the lens that diverges from at least one of the plurality of apertures.

16. The LIDAR device of claim 15, wherein a cross-sectional area of the one or more light detectors is greater than a cross-sectional area of the primary aperture.

17. The LIDAR device of claim 15, wherein a cross-sectional area of the one or more light detectors is greater than a sum of cross-sectional areas of the plurality of apertures.

18. The LIDAR device of claim 15, wherein the one or more light detectors is at a first distance to the lens, wherein the opaque material is at a second distance to the lens, and wherein the first distance is greater than the second distance.

19. The LIDAR device of claim 15, wherein the opaque material comprises an opaque mask overlaying a glass substrate.

20. The LIDAR device of claim 15, wherein the opaque material comprises a metal, and wherein the metal is etched to define the plurality of apertures.

21. A system comprising:
a light detection and ranging (LIDAR) device in a bistatic configuration, wherein the LIDAR device is configured to operate while moving relative to an object, the LIDAR device comprising:
a transmit lens that transmits light for illuminating the object;
a receive lens that focuses light from the object;
a spatial filter that receives the focused light from the receive lens, wherein the spatial filter includes:
a primary pinhole arranged to transmit, through the spatial filter, at least a threshold portion of the focused light based on the object being at greater than a threshold distance to the LIDAR device, wherein the primary pinhole is positioned to intersect an optical axis of the receive lens; and
a plurality of secondary pinholes positioned outside the optical axis, wherein the plurality of secondary pinholes include a first secondary pinhole at a first distance from the primary pinhole and a second secondary pinhole at a second distance from the primary pinhole, wherein the second distance is greater than the first distance, and wherein the one or more secondary pinholes are arranged to transmit, through the spatial filter, one or more portions of the focused light based on the object being at less than the threshold distance to the LIDAR device; and
one or more light detectors arranged to intercept diverging light, wherein the diverging light comprises light from the object focused by the lens that diverges from at least one pinhole in the spatial filter.

22. The system of claim 21, further comprising a vehicle, wherein the LIDAR device is coupled to the vehicle.

23. The system of claim 21, wherein the LIDAR device further comprises:
an emitter configured to emit the light transmitted through the transmit lens; and
a rotatable mirror that directs the emitted light from the transmit lens out of the LIDAR device, wherein the rotatable mirror rotates to define a plurality of directions of the transmitted light.

24. The system of claim 1, wherein the plurality of secondary apertures further include a third secondary aperture at a third distance from the primary aperture, wherein the third distance is greater than the second distance.

25. The system of claim 1, wherein the one or more light detectors include one or more single photon avalanche diodes (SPADs).

* * * * *